United States Patent
Wei

(10) Patent No.: US 6,560,196 B1
(45) Date of Patent: *May 6, 2003

(54) METHOD AND APPARATUS FOR CONTROLLING THE TRANSMISSION OF CELLS ACROSS A NETWORK

(75) Inventor: Sherry Xiaobo Wei, Palo Alto, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,961

(22) Filed: Nov. 19, 1998

(51) Int. Cl.[7] .............................. H04J 3/17; H04L 12/56
(52) U.S. Cl. ................. 370/230.1; 370/236; 370/395.4; 370/235.1
(58) Field of Search ................................ 370/229, 230, 370/330.1, 231–234, 235, 236, 236.1, 236.2, 395.4, 395.41, 395.42, 395.43, 468, 249, 250, 252

(56) References Cited

U.S. PATENT DOCUMENTS

| | | |
|---|---|---|
| 4,747,130 A | 5/1988 | Ho |
| 4,862,452 A | 8/1989 | Milton et al. |
| 4,991,169 A | 2/1991 | Davis et al. |
| 5,150,357 A | 9/1992 | Hopner |
| 5,224,099 A | 6/1993 | Corbalis et al. |
| 5,313,454 A | 5/1994 | Bustini et al. |
| 5,359,592 A | 10/1994 | Corbalis et al. |
| 5,434,981 A | 7/1995 | Lenihan et al. |
| 5,442,789 A | 8/1995 | Baker et al. |

(List continued on next page.)

OTHER PUBLICATIONS

Doug O'Leary, "Frame Relay/ATM PVC Service Interworking Implementation Agreement," Frame Relay Forum, pp. 1–24, Apr. 14, 1995.

Gary Lee, et al., "A Mangement Briefing on Frames to Cells, Frame Relay and Frame UNI in ATM Networks," General DataComm, pp. 1–12 (1997).

Addison Ching, "CEDPA Launches Discussion Lists", Oct.–Nov. 1997, The DataBus, vol. 37, No. 6, pp. 1–10 (Huntington Beach, CA, Oct.–Nov. 1997).

B. Thompson, et al., "DSP Resource Manager Interface and its Role in DSP Multimedia," IEEE, pp. 291–298, 1994.

(List continued on next page.)

Primary Examiner—Ricky Ngo
(74) Attorney, Agent, or Firm—Blakely, Sokoloff, Taylor & Zafman LLP

(57) ABSTRACT

A Multiservice Access Concentrator (MAC) provides traffic shaping by allocating at least one cell stream to at least one cell slot of a cell scheduling table. A cell slot and a corresponding cell stream are designated in response to a cell interrupt signal generated following cell transmission. At least one counter and at least one credit buffer are maintained, and a service class of the designated cell stream is determined. The size of the credit buffer is determined by a maximum burst cell size (MBC) of the corresponding cell stream and virtual circuit (VC). A cell of the designated cell stream is transmitted in response to the determined service class and a count of the at least one counter and contents of the at least one credit buffer. Therefore, cells are transmitted based on cell credits. A virtual circuit (VC) builds cell credit based on the sustained cell rate (SCR) of the VC. Cell credit is consumed as cells are transmitted. If no data is queued or transmitted, the cell credit builds to a maximum burst cell size (MBC). When data is queued again and credit is available, cell transmissions may burst to the peak cell rate (PCR) until credit is exhausted. Cell transmission timing is controlled using the cell interrupt signal, wherein the cell interrupt signal emulates a clock signal.

31 Claims, 18 Drawing Sheets

U.S. PATENT DOCUMENTS

| | | | |
|---|---|---|---|
| 5,497,373 A | | 3/1996 | Hulen et al. |
| 5,515,363 A | | 5/1996 | Ben-Nun et al. |
| 5,526,344 A | | 6/1996 | Diaz et al. |
| 5,561,663 A | | 10/1996 | Klausmeier |
| 5,594,727 A | | 1/1997 | Kolbenson et al. |
| 5,615,211 A | | 3/1997 | Santore et al. |
| 5,623,491 A | | 4/1997 | Skoog |
| 5,719,865 A | | 2/1998 | Sato |
| 5,724,513 A | | 3/1998 | Ben-Nun et al. |
| 5,734,656 A | | 3/1998 | Prince et al. |
| 5,742,596 A | | 4/1998 | Baratz et al. |
| 5,745,490 A | * | 4/1998 | Ghufran et al. ............. 370/397 |
| 5,765,032 A | | 6/1998 | Valizadeh |
| 5,771,232 A | | 6/1998 | Sinibaldi et al. |
| 5,793,747 A | | 8/1998 | Kline |
| 5,835,494 A | | 11/1998 | Hughes et al. |
| 5,838,994 A | | 11/1998 | Valizadeh |
| 5,862,211 A | | 1/1999 | Roush |
| 5,883,804 A | | 3/1999 | Christensen |
| 5,894,477 A | | 4/1999 | Brueckheimer et al. |
| 5,974,033 A | * | 10/1999 | Kamiya et al. ............. 370/230 |
| 6,002,666 A | * | 12/1999 | Fukano .................... 370/230.1 |
| 6,005,868 A | * | 12/1999 | Ito ............................. 370/232 |
| 6,009,507 A | | 12/1999 | Brooks et al. |
| 6,028,858 A | | 2/2000 | Rivers et al. |
| 6,052,375 A | * | 4/2000 | Bass et al. ............... 370/230.1 |
| 6,058,117 A | | 5/2000 | Ennamorato et al. |
| 6,104,721 A | | 8/2000 | Hsu |
| 6,118,864 A | | 9/2000 | Chang et al. |
| 6,144,637 A | * | 11/2000 | Calvignac et al. .......... 370/229 |
| 6,181,694 B1 | | 1/2001 | Pickett |
| 6,266,342 B1 | | 7/2001 | Stacey et al. |
| 6,272,109 B1 | * | 8/2001 | Pei et al. .................... 370/230 |

OTHER PUBLICATIONS

Edward B. Morgan, "Voice Over Packet, White Paper," Telogy Networks, pp. 1–13, 1997.

S. Mangiapan, "Cisco Announces MC3810 Multiservice Access Concentrator," The Databus, vol. 37, No. 6, pp. 1–3, Oct.–Nov. 1997.

*Voice Over Frame Relay Implementation Agreement, FRF 11.1*, Frame Relay Forum Technical Committee, pp. I–vi and 1–46 (Revision History: FRF.11 May 1997; FRF. 11.1 Annex J Added Dec. 1998).

*Annex B to Voice Over Frame Relay Implementation Agreement, FRF .11*, Frame Relay Forum Technical Committee, pp. B–1 & B–2 (May 1997).

R. Iyer & Ciso Systems, *A TDM Interface for the TMS320C54x DSP, Application Report: SPRA453*, Digital Signal Processing Solutions (Texas Instruments Jun. 1998).

* cited by examiner

METHOD AND APPARATUS FOR CONTROLLING THE TRANSMISSION OF CELLS ACROSS A NETWORK

FIELD OF THE INVENTION

The present invention relates generally to the routing of information across networks and, more particularly, to traffic shaping in multiservice networks.

BACKGROUND OF THE INVENTION

Until recently there has persisted a fundamental dichotomy between two main types of telecommunication networks. The first type of telecommunication network, the telephone network, switches and transports predominantly voice, facsimile, and modulation-demodulation system (modem) traffic. The public switched telephone network (PSTN) is an example of this type of network. Telephone networks are also deployed privately within organizations such as corporations, banks, campuses, and government offices. The second type of telecommunication network, the data network, switches or routes and transports data and video between computers. The Internet is an example of a public data network; data networks may be privately deployed.

Telephone networks were developed and deployed earlier, followed by data networks. Telephone network infrastructures are ubiquitous, however, and as a result data networks typically are built, to a limited extent, using some components of telephone networks. For example, the end user access link to a data network in some cases is implemented with a dial-up telephone line. The dial-up telephone line thus connects the end user computer equipment to the data network access gateway. Also, high speed digital trunks interconnecting remote switches and routers of a data network are often leased from telephone long-haul carriers.

Nonetheless, telephone and data network infrastructures were typically deployed together with limited sharing of resources, especially with regards to the core components of the networks—the switches and routers that steer the payloads throughout the networks. Furthermore, multiservice network switches are used to provide a data path, or interface, between multiple networks, each of which may operate using a different type of data or according to a different networking standard protocol. Examples of the networking protocols supported by these multiservice switches include, but are not limited to, frame relay, voice, circuit emulation, T1 channelized, E1 channelized, and Asynchronous Transfer Mode (ATM). The cost of this redundancy coupled with advances in data network technology has led, where possible, to integrated network traffic comprising voice, data, facsimile, and modem information over a unified data network. As such, a network should now be able to accept, service, integrate, and deliver multiple types of data over its access links on a random, dynamic basis using a minimum set of hardware on a single platform. This is typically accomplished using network routers, or concentrators, that provide for dynamic allocation of network resources among the received channels of information on an as-needed basis, wherein the cost, size, and complexity of the router is reduced by minimizing the duplication of resources among router channels.

One type of network technology, ATM, is a connection based technology designed to provide flexible use of network bandwidth in order to support users having diverse service requirements. The functionality provided by a concentrator in an ATM network comprises supporting the Quality of Service (QoS) for each virtual circuit (VC), or connection, supported by the router. The QoS is a set of parameters and measurement procedures defined to quantify loss, errors, delay, and delay variation. The QoS is established when the VCs are established, and the QoS parameters include loss rate, acceptable delay, and peak and average data rates.

A network determines, when a connection request is made, whether sufficient resources exist to allow the connection to be established with the requested parameters, while not impacting the QoS of established connections. If sufficient resources do not exist to support the requested QoS, the connection request is rejected. If sufficient resources do exist to support the requested QoS, a connection is established, and the network ensures that each transmitting station meets the QoS for each VC of that station. Traffic shaping is a procedure used at the transmitting end station and intermediate stations to ensure that the QoS is supported. Traffic shaping parameters typically comprise sustained cell rate (SCR), peak cell rate (PCR), and maximum burst cell count (MBC).

Traffic shaping ensures support of the QoS for established connections by ensuring that the transmission rate for any given VC does not exceed the peak or average data rate allowed for that VC. Specifically, traffic shaping functionality allows an ATM device to control an outgoing cell stream such that the SCR does not exceed a prescribed SCR at any given time, the PCR does not exceed a prescribed PCR at any given time, and the MBC does not exceed a prescribed MBC at any given time. Typical traffic shaping mechanisms require the use of counters, timers, and control logic for each one of the potential VCs of a network station. In particular, at least one timer is used to control the SCR and PCR of a cell transmission. The problem with the typical mechanisms, however, is that, as the number of VCs of a typical network station is large, and as the router must simultaneously support QoS standards for this large number of VCs, the chip silicon area and die size required for the associated counters and timers is significant. Furthermore, and even more problematic, is that in low cost, low speed networks, for example ATM over T1, the additional timer interrupts cause an excessive processor load.

SUMMARY AND OBJECTS OF THE INVENTION

It is therefore an object of the invention to provide efficient traffic shaping in Asynchronous Transfer Mode (ATM) networks without the use of timers.

It is a further object of the invention to control the timing of cell transmission over ATM networks using a signal generated by the ATM layer upon cell transmission.

It is a further object of the invention to reduce the processing loads on network processors of low speed ATM networks by reducing timer interrupts.

These and other objects of the invention are provided by a Multiservice Access Concentrator (MAC), wherein traffic shaping, or control of cell transmission through a network, comprises allocating at least one cell stream to at least one cell slot of a cell scheduling table. A cell slot and a corresponding cell stream are designated in response to a cell interrupt signal generated following cell transmission. At least one counter and at least one credit buffer are maintained, and a service class of the designated cell stream is determined. Maintaining at least one counter comprises maintaining an individual counter for each cell stream, wherein the individual counter increments following each transmission of a cell of the corresponding cell stream. Furthermore, a global counter is maintained that increments following each transmission of a cell.

A cell of the designated cell stream is transmitted in response to the determined service class and a count of the at least one counter and contents of the at least one credit buffer. When the service class is determined to be constant bit rate (CBR), a cell is transmitted. When the service class is determined to be variable bit rate (VBR) a credit buffer is generated. The size of the credit buffer is determined by a maximum burst cell size (MBC) of the corresponding cell stream and virtual circuit (VC). The credit buffers are grouped along with the corresponding cell streams in at least one group according to Quality of Service (QoS) parameters.

A determination is made as to whether the MBC has been exceeded for the designated cell stream. In response to a determination that the MBC has not been exceeded, the credit buffer of the designated cell stream is incremented, wherein cell credit is accumulated based on a sustained cell rate (SCR) of the designated cell stream. A counter difference is determined by subtracting the individual counter associated with the designated cell stream from the value of the global counter. A cell of the designated cell stream is transmitted when the counter difference equals an inverse of a peak cell rate (PCR) and the credit buffer of the designated cell stream contains credit. Cell transmission may burst to a PCR until cell credit is exhausted. Transmission of the cell of the designated cell stream is based on the accumulated cell credit. The credit buffer of the designated cell stream is decremented in response to cell transmission, wherein cell credit is consumed upon cell transmission. Cell transmission timing is controlled using the cell interrupt signal, wherein the cell interrupt signal emulates a clock signal.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
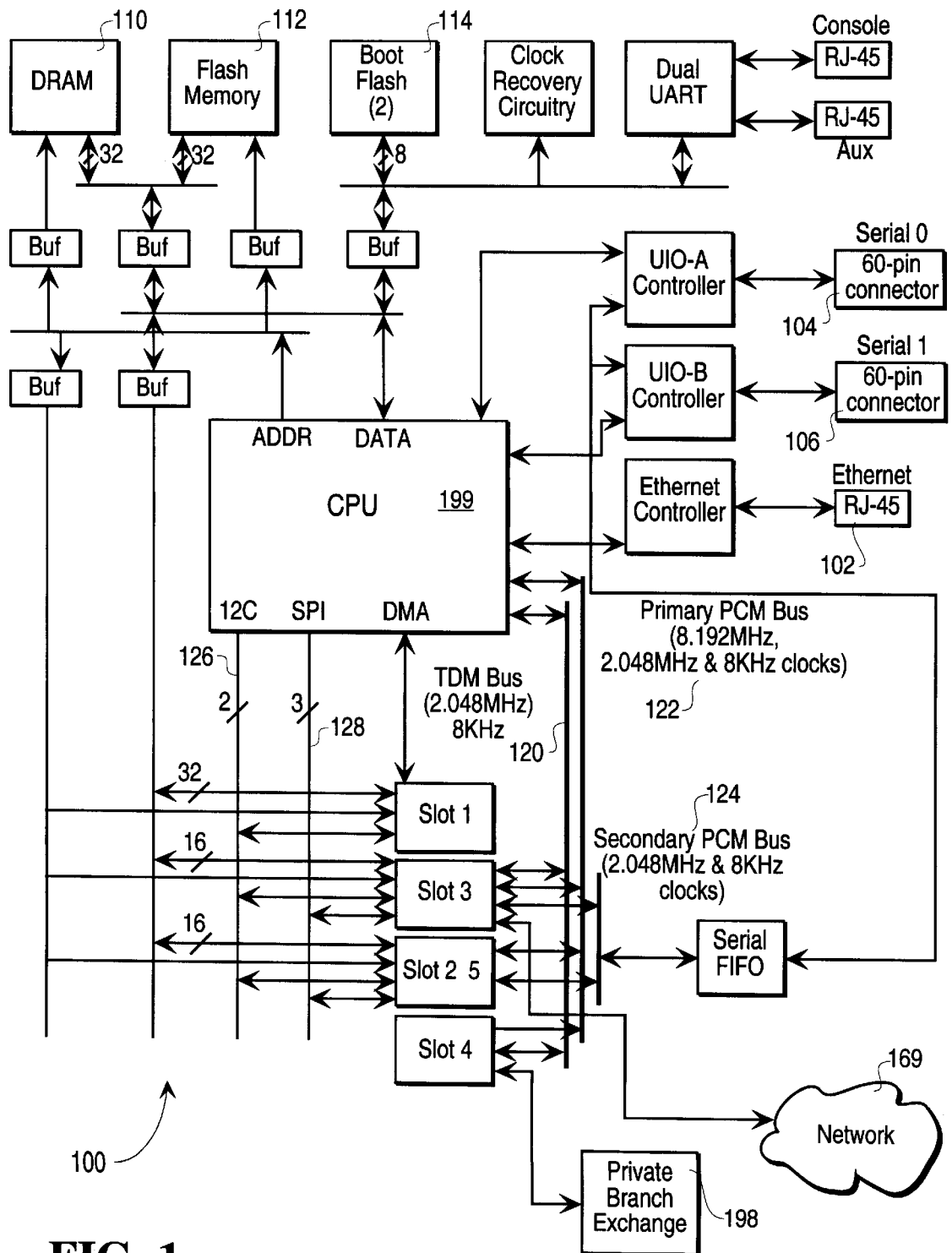
FIG. 1 is a system block diagram of a Multiservice Access Concentrator (MAC) of an embodiment of the present invention for routing integrated data, voice, and video traffic.

FIG. 1 is a system block diagram of a Multiservice Access Concentrator (MAC) 100 of an embodiment of the present invention for routing integrated data, voice, and video traffic. The MAC 100 of an embodiment is a compact, low-cost multi-service access device that integrates local area network (LAN), synchronous data, voice, video and facsimile traffic for transport over a network system 169 comprising public and private Frame Relay, asynchronous transfer mode (ATM), synchronous transfer mode, bisynchronous transfer mode, and time division multiplexed (TDM) networks. Multi-protocol routing is combined with voice, but the embodiment is not so limited. The video support of the MAC of an embodiment comprises transport over ATM, Frame Relay, and TDM circuits. The MAC uses a software-configurable wide area network (WAN) trunk to seamlessly integrate data, voice, and video into existing networks using common switch and network hardware, and without reconfiguring the network switch hardware, but the embodiment is not so limited. Furthermore, traffic shaping is implemented in microcode and software, but the embodiment is not so limited. In an embodiment, cells are transmitted based on cell credits. A virtual circuit (VC) builds cell credit based on the sustained cell rate (SCR) of the VC. Cell credit is consumed as cells are transmitted. If no data is queued or transmitted, the cell credit builds to a maximum burst cell size (MBC). When data is queued again and credit is available, cell transmissions may burst to the peak cell rate (PCR) until credit is exhausted.

The MAC of an embodiment provides capabilities comprising, but not limited to ATM or Frame Relay technology over T1/E1, Circuit Emulation Service (CES) for video, packetized voice over ATM, Frame Relay, and Internet Protocol (IP), voice compression, and telephony capabilities. The MAC of an embodiment has the processing power to meet the demands of an ATM access device, and can multiplex voice, video, and data applications onto trunks running at speeds from 56/64 kbps to E1, but the embodiment is not so limited.

The software architecture of the MAC of an embodiment is a modular design which may be used in a distributed environment, but the embodiment is not so limited. The MAC uses an internetwork software operating system that provides kernel services, network services and routing capability, but the embodiment is not so limited. The interface ports of the MAC of an embodiment comprise a single Ethernet port 102, two serial ports 104–106 that support speeds up to 2 Mbps, and either six analog voice ports or a single digital voice access port (T1/E1), but the embodiment is not so limited. The analog voice port configuration provides up to six uncompressed or compressed voice channels, while the digital voice port configuration provides up to 24 compressed voice channels, but the embodiment is not so limited. As many as 30 channels are available for passing voice channels via TDM channels, but the embodiment is not so limited. Furthermore, combinations of compressed and PCM voice are available.

The MAC of an embodiment provides a 10BaseT Ethernet port or two universal input/output (UIO) serial ports to provide data and video, and route it to the proper destination using a wide area network (WAN) trunk, but the embodiment is not so limited. The UIO supports connectivity to a digital carrier service at a number of clock rates. There are two UIO serial ports, serial 0 and serial 1. Serial 0 receives timing data, or clock data, and distributes it to serial 1. Consequently, serial 0 should be used as a network trunk port, but the embodiment is not so limited. Furthermore, the UIO port receives video traffic. Following circuit emulation, the video traffic is transported using the WAN trunk. The MAC supports analog voice streams using Ear and Mouth (E&M) (2 wire and 4 wire with immediate dial, delay dial and wink start), Foreign Exchange Station (FXS) (ground start and loop start), and Foreign Exchange Office (FXO) (ground start and loop start) voice signal standards. Furthermore, the MAC supports digital voice streams using T1/E1/UIO interfaces. The MAC receives the voice traffic from these ports and implements a voice compression algorithm, but the embodiment is not so limited. Moreover, echo cancellation is also implemented to improve the quality, wherein 8 to 32 millisecond echo tails are accommodated, but the embodiment is not so limited. The compressed voice is packetized and transported over the WAN trunk. The WAN trunk access of an embodiment is through either a T1/E1 access card or a UIO port that supports ATM (T1/E1 trunk), Frame Relay, and HDLC networks.

Figure 2:
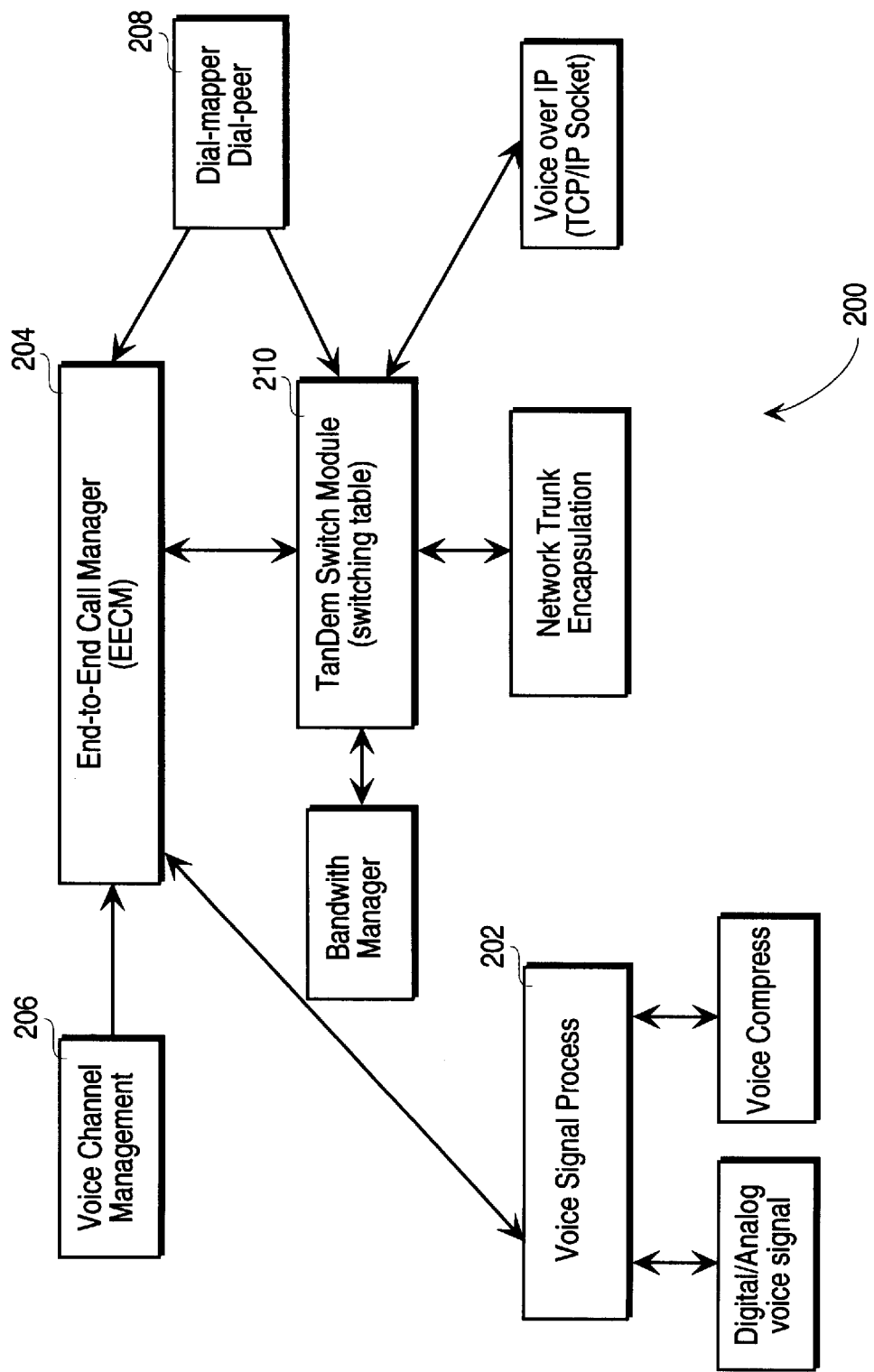
FIG. 2 is a voice processing subsystem of a MAC of an embodiment of the present invention.

FIG. 2 is a voice processing subsystem 200 of a MAC of an embodiment of the present invention. The internetwork software operating system that provides kernel services, network services and routing capability comprises the voice processing subsystem 200, but the embodiment is not so limited. In operation, an analog voice port or digital voice port provides a voice signal to the Voice Signal Process module 202. The Voice Signal Process module 202 translates the voice signal to a call setup message. The call setup message is sent to the End-to-End Call Manager (EECM) 204, wherein a call setup procedure is initiated. The call setup procedure comprises calling the Voice Channel Manager 206 to allocate a DSP for connection to the receiving voice port via the PCM bus. Furthermore, the call setup procedure signals the Voice Signal Process module 202 to enable the allocated DSP to start the DTMF sampling for the dialing digits. Upon collection of enough digits by consulting the dial-mapper 208, a setup message is provided to the Tandem Switch Module 210. The Tandem Switch Module 210, using the Dial-peer and Dial-mapper 208, locates the permanent virtual connection (PVC) number of the remote extension in order to provide a setup message.

With reference to FIG. 1, the interface ports of the MAC 100 are coupled to a central processing unit (CPU) 199, but the embodiment is not so limited. Multiple memory devices 110–114 are coupled to the CPU 199 of one embodiment, wherein dynamic random access memory (DRAM) 110 is supported in 4, 8, 16, and 32 Mb single inline memory modules (SIMMs) and flash memory 112–114, or nonvolatile memory, is supported in 4, 8, and 16 Mb memory devices, but the embodiment is not so limited. A 32-bit SIMM socket supports up to 64-Mbyte of program memory and data storage memory 110. A 32-bit SIMM socket supports up to 32-Mbyte of flash memory 112. Furthermore, a 512-Kbyte boot flash 114 is provided, but the embodiment is not so limited. Moreover, a 2-Mbyte on-board flash memory 112 supports system configuration.

The MAC of an embodiment comprises five option slots coupled to the CPU 199, but the embodiment is not so limited. The option slots provide expanded services for voice and data using plug-in modules (PIMs), but are not so limited. The plug-in modules supported in an embodiment comprise a multi-flex trunk module (MTM), a voice compression module (VCM), an analog voice module (AVM), a digital voice module (DVM), and a data compression/encryption module (DCM), but the embodiment is not so limited.

The MAC of an embodiment comprises a bus system that couples the resources of the MAC. The bus system comprises a host bus, a system memory bus, an extended auxiliary bus, a plug-in module slot bus, a PCM bus, an I-square bus, and an SPI bus, but the embodiment is not so limited. The buses of an embodiment are coupled to the CPU directly or to the host bus using buffers. A bus controller maintains control of the buffers for each bus transaction. The bus controller of one embodiment is implemented using field programmable gate arrays (FPGAs), but the embodiment is not so limited.

The host bus of an embodiment is an extension of the CPU external interface signals which include 32-bit data bus signals, 32-bit address bus signals, and bus transaction control signals, but the embodiment is not so limited. As the MAC of an embodiment has one CPU, or master, there is no external bus arbitration logic to support multiple masters, but the embodiment is not so limited.

The system memory bus of the MAC of an embodiment is a 32-bit bus coupled to the host bus using at least one buffer, but the embodiment is not so limited. The CPU and DMA can access system main memory, a dynamic random access memory (DRAM), but the embodiment is not so limited. Furthermore, the 32-bit flash memory for internetwork operating system code storage resides on the system memory bus.

The extended auxiliary bus of the MAC of an embodiment comprises an 8-bit bus which is connected to the host bus through a buffer, but the embodiment is not so limited. The 512-Kbyte boot-flash memory, 2-Mbyte on-board flash memory, and a dual UART device reside on the extended auxiliary bus.

As discussed herein, and with reference to FIG. 1, the MAC of an embodiment comprises five plug-in module (PIM) slots. The PIM slot bus provides the signals among the CPU 199 and each of these slots. Each of the slots share common signals including bus transaction control, data and address, and voltage and return ground signals.

The MAC 100 of an embodiment comprises three PCM buses 120–124, but the embodiment is not so limited. The PCM bus signals comprise an 8K frame sync pulse mark, 2.048 MHz clock, 8 MHz clock, transmit data, and receive data, but the embodiment is not so limited.

The first PCM bus is a TDM bus 120 between the CPU 199 and PIM slots 3 and 4 that provides a dedicated serial connection between the CPU 199 and the MTM. The second PCM bus is the primary PCM bus 122 that couples the CPU 199 among PIM slots 2, 3, 4, and 5. The primary PCM bus 122 is used among the AVM, VCM, DVM, DCM, and CPU for voice applications. For example, after the analog voice signal is converted into 8-bit PCM data by a coder/decoder (codec) on the AVM, it can be mapped into one of 32 time slots of this PCM bus, but the embodiment is not so limited. Then the VCM can be programmed to pick up the PCM data from this time slot and compress it to 8 Kbps data.

The primary PCM bus 122 of an embodiment comprises a 32-time-slot PCM bus, but the embodiment is not so limited. The primary PCM bus 122 provides the voice data from the Digital Voice Module or the Analog Voice Module. The primary PCM bus 122 of an embodiment runs at an approximate clock speed of 2.048 MHz, wherein the clock is derived from the network, but the embodiment is not so limited. One end of the primary PCM bus 122 receives voice in a PCM format from a voice I/O device; the other end of the primary PCM bus 122 can be coupled to devices comprising a digital signal processor, a CPU, and a T1/E1 network trunk, but the embodiment is not so limited. Each voice port is dynamically coupled to one of the PCM bus time slots by programming the cross-connect device when it detects the off-hook signal from a voice port. Upon completion of a voice call, the PCM time-slot is freed for the next call, wherein the next call may come from a different voice port.

The third PCM bus is the secondary PCM bus 124 that couples PIM slots 2, 3, and 5 to a UIO port 104. The secondary PCM bus 124 is used for mapping N×64 Kbps data from UIO ports to any time slot on the trunk line in the MTM on PIM slot, but the embodiment is not so limited.

The I-square bus 126 of the MAC 100 of an embodiment is a two-wire interface that provides serial data and a clock signal of approximately 189 KHz from the CPU 199 to PIM slots 1, 2, 3, and 5. The CPU 199 uses the synchronous I-square bus 126 to exchange data with the EEPROM of the corresponding PIM slots.

The Serial Peripheral Interface (SPI) bus 128 of the MAC 100 of an embodiment is routed among the CPU 199 and PIM slots 2, 3, and 5. The SPI bus 128 is a serial peripheral interface comprising four wires: clock, transmit data, receive data and slave device select. The SPI bus 128 of an embodiment is running at 700 KHz, but the embodiment is not so limited. When the slave device is selected, the master (CPU) uses the clock to shift out the transmitted data and shift in the received data. The SPI bus 128 provides another serial communication channel between the CPU 199 and the modules of the PIM slots.

The MAC of an embodiment supports an MTM PIM. The MTM is the option module which provides users with a software-configurable T1/E1 trunk capability having built-in, long-haul Channel Service Unit (CSU)/short-haul Data Service Unit (DSU), wherein common hardware supports the software-configurable trunk. The MTM may be coupled to Frame Relay, ATM, or leased-line carrier services. When the MTM is present in the MAC, the MAC supports either packet or circuit switch applications. As such, the MTM supports ATM, Frame Relay, and serial link protocols as the network encapsulation. The line coded T1/E1 data is converted to 2.048 Mbps PCM data by an on-board framer; this framer extracts the clock from the received data, and the timing information is distributed to the UIOs and DVM. An Integrated Services Digital Network (ISDN) port provides a network back-up connection when the T1/E1 trunk is down, but the embodiment is not so limited. When the MTM is not present in the MAC, the MAC uses a UIO as the network trunk, wherein the MAC supports HDLC for Frame Relay protocol or serial link protocol.

The MAC of an embodiment comprises two PIMs that are used for network access, the DVM and AVM. The DVM, functionally equivalent to the MTM, provides connectivity to a digital private branch exchange 198 or channel bank. The voice channels can be either mapped to time slots on the primary PCM bus for voice compression or mapped to time slots on another PCM bus through a cross-connect switch.

The AVM of an embodiment supports telephone signaling interfaces comprising FXS, FXO and E&M, but the embodiment is not so limited. The AVM provides up to six analog voice ports in any combination of these interfaces, wherein the analog voice ports provide coupling between the MAC and a Key Telephone System (KTS) or even directly to a phone set. There is one sub-module for each interface that resides on the AVM. Furthermore, the AVM provides the standard telecommunication interface voltages. The on-board codecs are used to provide the analog-to-digital and digital-to-analog functions to interface the analog voice system to the PCM sub-system.

The MAC of an embodiment supports streaming video in a variety of ways. First, video traffic received from a video codec connected to a UIO port is transported on a dedicated time slot between systems using the TDM functionality of a T1/E1 trunk. Alternatively, a serial stream from a video codec is converted to ATM and transported across an ATM network. Finally, LAN-based video from IP networks can be routed through a MAC and transported via networks comprising ATM, Frame Relay, and HDLC networks.

The MAC of an embodiment supports ATM, Frame Relay, HDLC, and TDM trunk services. As such, the T1/E1 network trunk port hardware of the MAC of an embodiment can be configured using software to support three modes, but the embodiment is not so limited. The supported modes comprise: whole T1/E1 pipe running either ATM or HDLC (Frame Relay) data format; fractional T1/E1 running HDLC for Frame Relay only; and, fractional T1/E1 running HDLC for Frame Relay and some channels running TDM traffic. A TDM channel may be configured for use in video and voice applications. The video traffic is received from one of the UIO ports while the voice traffic is received from the UIO/Fractional T1/E1 Access port or from the Analog Voice Module, but the embodiment is not so limited. The TDM trunk provides channel-bank functionality not found in typical data access devices. The TDM capability provides greater flexibility in application support and reduces access charges by allowing multiple applications to use the same access trunk. For example, a group of time slots on the trunk may be allocated to Frame Relay, while others may be used for private branch exchange trunks, and still others may be allocated for video conferencing.

Furthermore, the MAC of an embodiment is software configurable for Frame Relay and ATM access. Voice, facsimile, and data are transported over ATM using a variable bit rate or a constant bit rate, but the embodiment is not so limited. Both structured and unstructured constant bit rate support is provided for video traffic.

Figure 3:
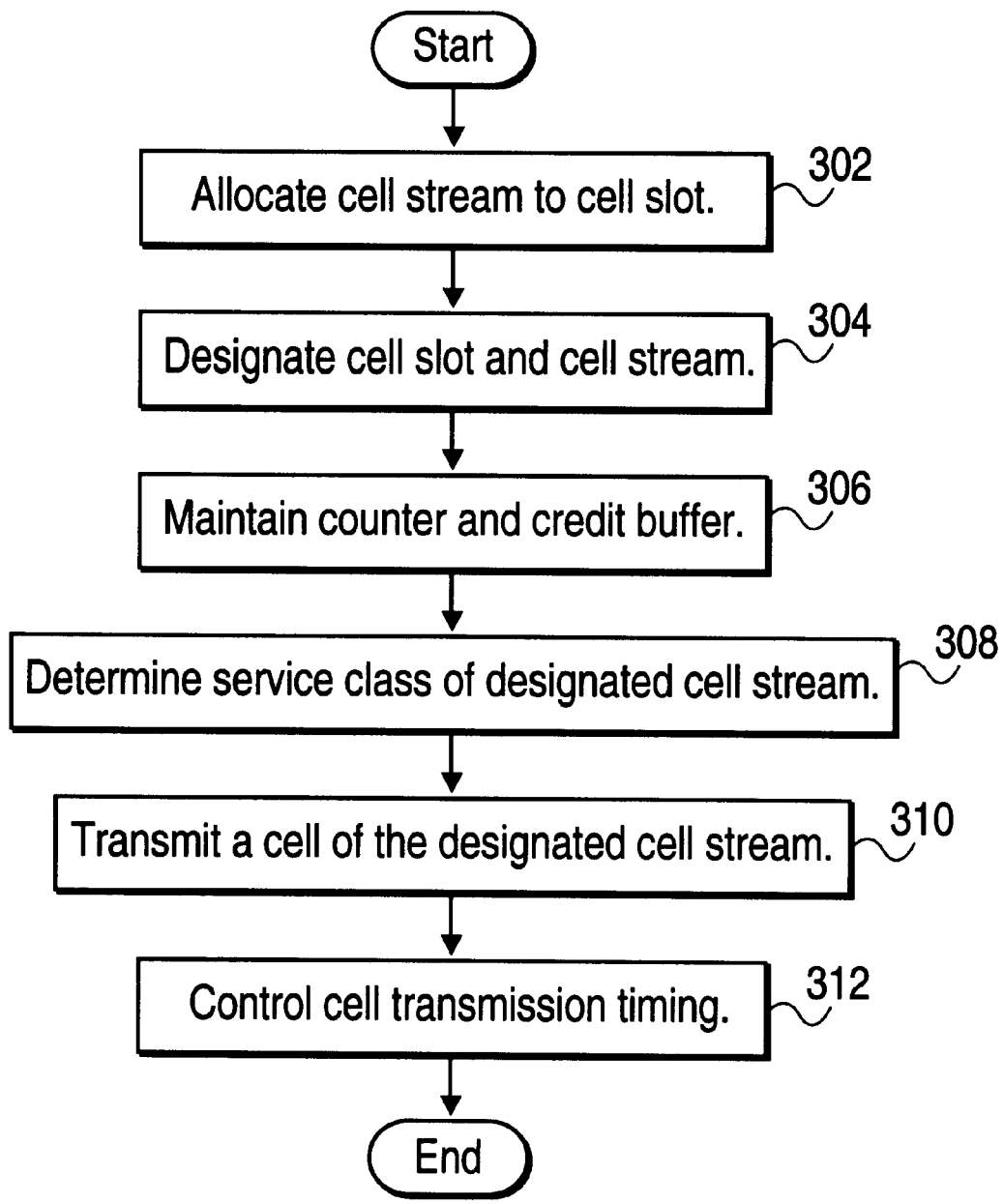
FIG. 3 is a flowchart for controlling the transmission of cells, or traffic shaping, in an embodiment of the present invention.

FIG. 3 is a flowchart for controlling the transmission of cells, or traffic shaping, in an embodiment of the present invention. Operation begins at step 302, at which at least one cell stream is allocated to at least one cell slot of a cell scheduling table. In an embodiment, the cell scheduling table is per-cell-slot based and comprises N cell slots, but the embodiment is not so limited. In an ATM network, the number of cell slots is determined using an ATM line rate, but the embodiment is not so limited. Furthermore, at least one cell slot is reserved based on a sustained cell rate (SCR) of a reserving virtual circuit (VC) cell stream relative to a bandwidth of the network. For example, for ATM over T1, a VC having an SCR of 768 kbps will have a reservation on every other cell slot, while a VC having an SCR of 384 kbps will have a reservation on every fourth cell slot.

At step 304, a cell slot and a corresponding cell stream are designated in response to a cell interrupt signal generated following cell transmission. At least one counter and at least one credit buffer are maintained, at step 306, and a service class of the designated cell stream is determined, at step 308. Maintaining at least one counter comprises maintaining an individual counter for each cell stream, wherein the individual counter increments following each transmission of a cell of the corresponding cell stream. Furthermore, a global counter is maintained that increments following each transmission of a cell.

A cell of the designated cell stream is transmitted, at step 310, in response to the determined service class and a count of the at least one counter and contents of the at least one credit buffer. When the service class is determined to be constant bit rate (CBR), a cell is transmitted. When the service class is determined to be variable bit rate (VBR), a credit buffer is generated. The size of the credit buffer is determined by a maximum burst cell size (MBC) of the corresponding cell stream and virtual circuit (VC). The credit buffers are grouped along with the corresponding cell streams in at least one group according to Quality of Service (QoS) parameters.

A determination is made as to whether the MBC has been exceeded for the designated cell stream. In response to a determination that the MBC has not been exceeded, the credit buffer of the designated cell stream is incremented, wherein cell credit is accumulated based on a sustained cell rate (SCR) of the designated cell stream. A counter difference is determined by subtracting the individual counter associated with the designated cell stream from the value of the global counter. A cell of the designated cell stream is transmitted when the counter difference equals or is greater than an inverse of a peak cell rate (PCR) and the credit buffer of the designated cell stream contains credit. Cell transmission may burst to a PCR until cell credit is exhausted, wherein transmission of the cell is based on the accumulated cell credit. The credit buffer of the designated cell stream is decremented in response to cell transmission, wherein cell credit is consumed upon cell transmission. When user data is unavailable for transmission, idle cells are transmitted.

Operation continues at step 312, at which cell transmission timing is controlled using the cell interrupt signal, wherein the cell interrupt signal emulates a clock signal. In an ATM network, the cell interrupt signal is generated by at least one ATM layer upon cell transmission to serve as a clock signal to control a traffic shaping scheduler to control the SCR, PCR, and MBC of an ATM network, but the embodiment is not so limited. The advantage found in an embodiment of the present invention is that a dedicated physical clock is not required to control the timing of cell transmission. Instead, the clock is emulated by the cell interrupt signal generated at the end of a cell transmission.

The apparatus of an embodiment for controlling the transmission of cells through a network comprises at least one processor. An input coupled to the processor is capable of receiving cells. The processor of an embodiment is configured to allocate at least one cell stream to at least one cell slot of a cell scheduling table, and to designate a cell slot and a corresponding cell stream in response to at least one signal generated following cell transmission. Furthermore, the processor is configured to maintain at least one counter and at least one credit buffer. Moreover, the processor is configured to determine a service class of the designated cell stream, and to transmit a cell of the designated cell stream in response to the determined service class and a count of the counter and contents of the credit buffer. The processor controls the timing of cell transmission through an output using the signal generated following cell transmission.

Figure 3A:
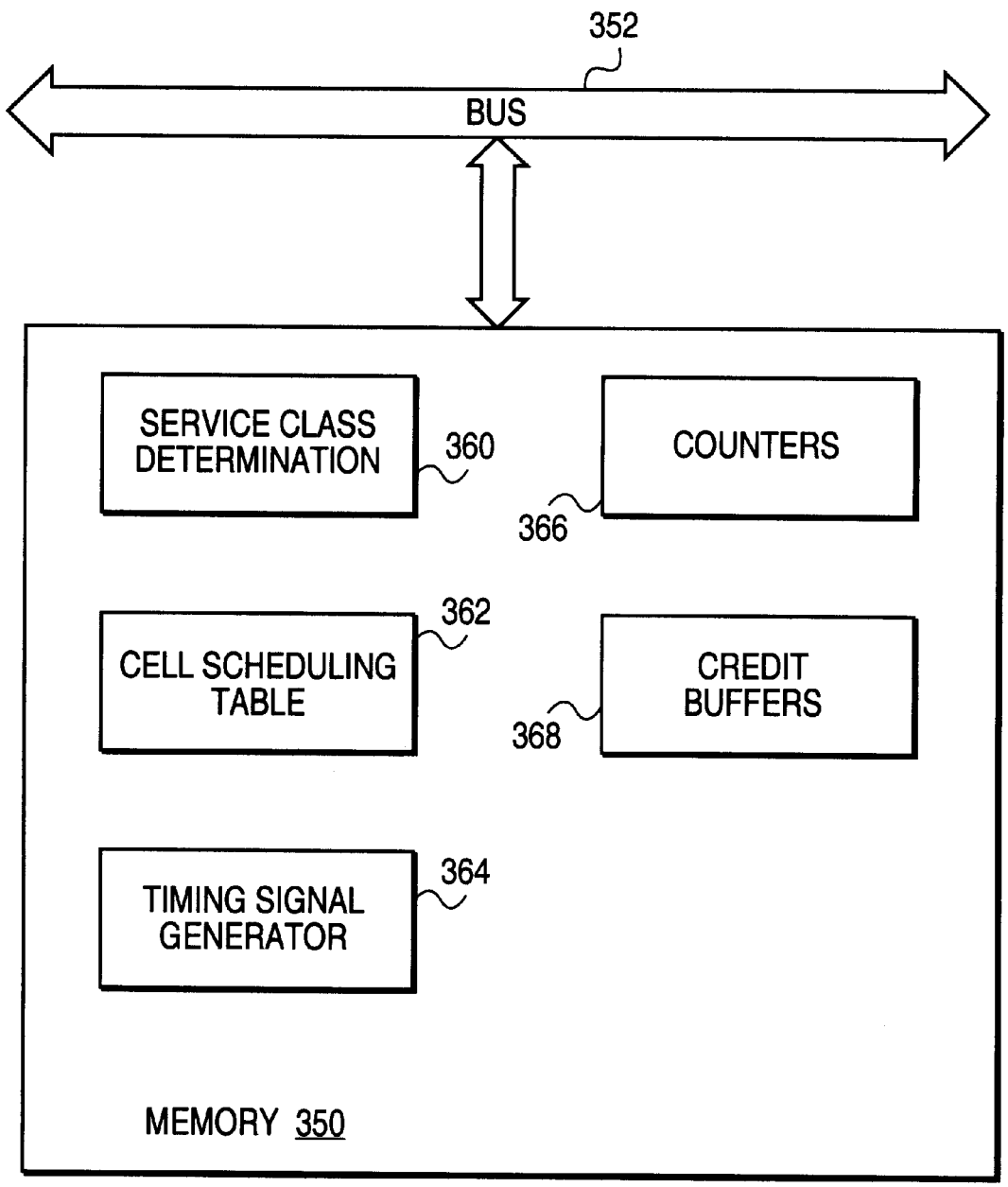
FIG. 3A shows a computer system memory device hosting components, modules, or algorithms, of an apparatus of an embodiment of the present invention for controlling the transmission of cells through a network.

FIG. 3A shows a computer system memory device 350 hosting components 360–368, modules, or algorithms, of an apparatus of an embodiment of the present invention for controlling the transmission of cells through a network. The memory device 350 is coupled to the cell transmission control apparatus using a bus 352, but the embodiment is not so limited. The components 360–368 of the memory device 350 comprise a service class determination module 360, a cell scheduling table 362, a timing signal generator 364, counters 366, and credit buffers 368, but the embodiment is not so limited. The components 360–368 may be hosted on a processor, but the embodiment is not so limited. For an alternate embodiment, the apparatus may comprise some combination of hardware, firmware, and software that is hosted on a different processor or in different memory modules or types from components 360–368. For another alternate embodiment, a number of memory devices, each comprising a different module, may be hosted on a number of different processors. Another alternate embodiment has multiple processors hosting a single module. For still another embodiment, a number of different memory devices may be hosted on a single processor.

Figure 4:
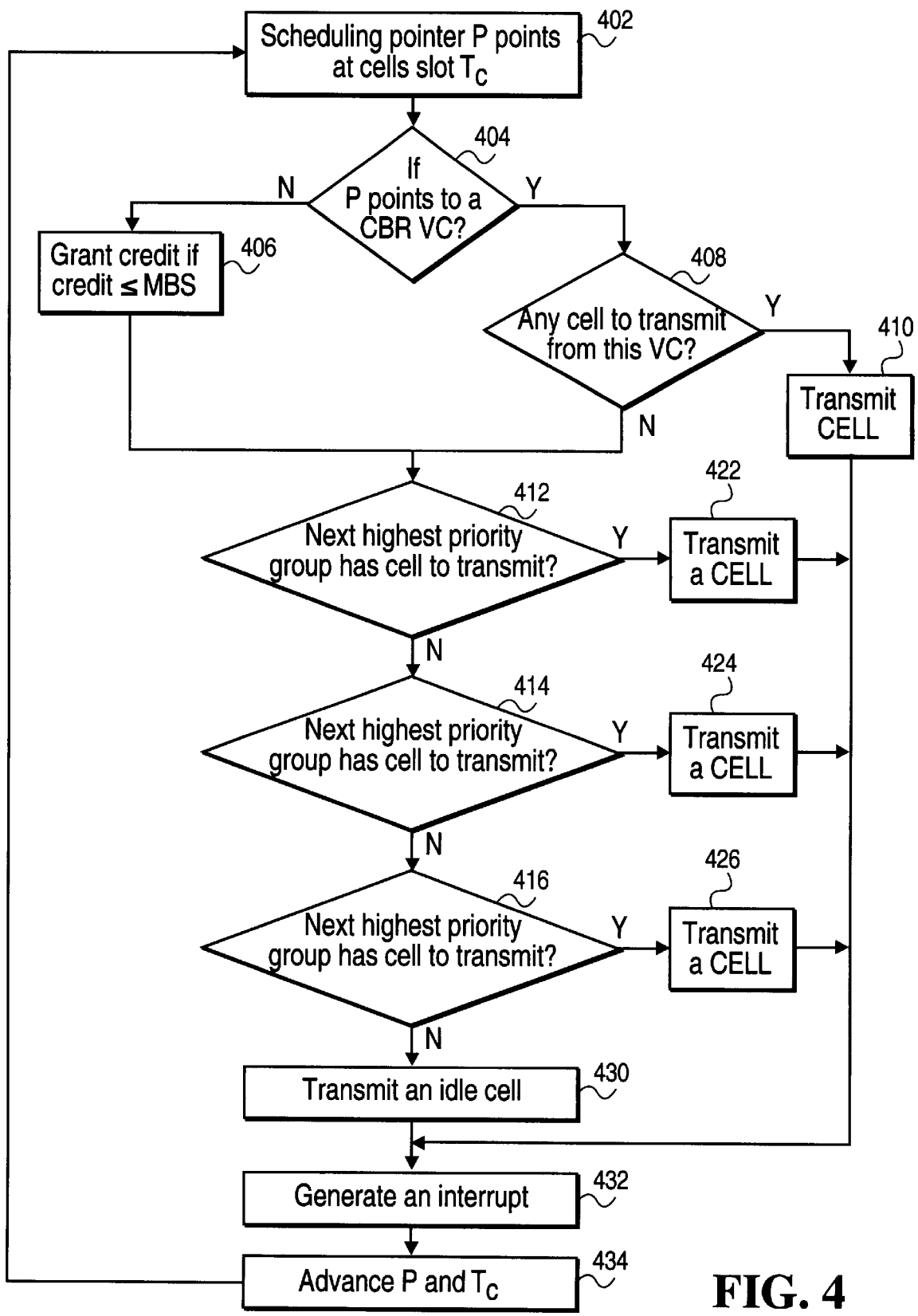
FIG. 4 is a flowchart for selecting cells for transmission during traffic shaping in an embodiment of the present invention.

FIG. 4 is a flowchart for selecting cells for transmission during traffic shaping in an embodiment of the present invention. As discussed herein, the VCs are grouped based on priority, but the embodiment is not so limited. In operation, a pointer, P, is used to designate a cell slot, or time slot, in the scheduling table. Operation begins at step 402, at which scheduling pointer P points to a particular cell slot, Tc. At step 404, a determination is made whether the pointer points to a CBR VC. If the pointer does not designate a CBR VC; then credit is granted to the associated credit buffer, at step 406, as long as the MBC of the associated cell stream will not be exceeded, and operation continues at step 412. If the pointer designates a CBR VC, then a determination is made whether a cell is available for transmission, at step 408. If a cell is available for transmission, the cell is transmitted, at step 410, and operation continues at step 432.

If no cell is available for transmission from the CBR VC, operation continues at step 412, at which a determination is made whether the next highest priority VC group has a cell available for transmission. If a cell is available for transmission, the cell is transmitted, at step 422, and operation continues at step 432. Within each VC group, the VCs are linked in a circular chain, but the embodiment is not so limited. Therefore, in determining whether a cell is available for transmission, the chained VCs of the group are inspected in succession until a VC is found having a cell available for transmission, or until all VCs of the group have been inspected, but the embodiment is not so limited.

If no cell is available for transmission from the VC group, at step 412, operation continues at step 414, at which a determination is made whether the next highest priority VC group has a cell available for transmission. If a cell is available for transmission, the cell is transmitted, at step 424, and operation continues at step 432.

If no cell is available for transmission from the VC group, at step 414, operation continues at step 416, at which a determination is made whether the next highest priority VC group has a cell available for transmission. In an embodiment, VCs having an unspecified bit rate have the lowest priority, but the embodiment is not so limited. If a cell is available for transmission, the cell is transmitted, at step 426, and operation continues at step 432. If no cell is available for transmission from the VC group, at step 416, operation continues at step 430, at which an idle cell is transmitted. An interrupt is generated, at step 432, the pointer is advanced to the next cell slot in the scheduling table, at step 434, and operation continues at step 402.

Figure 5:
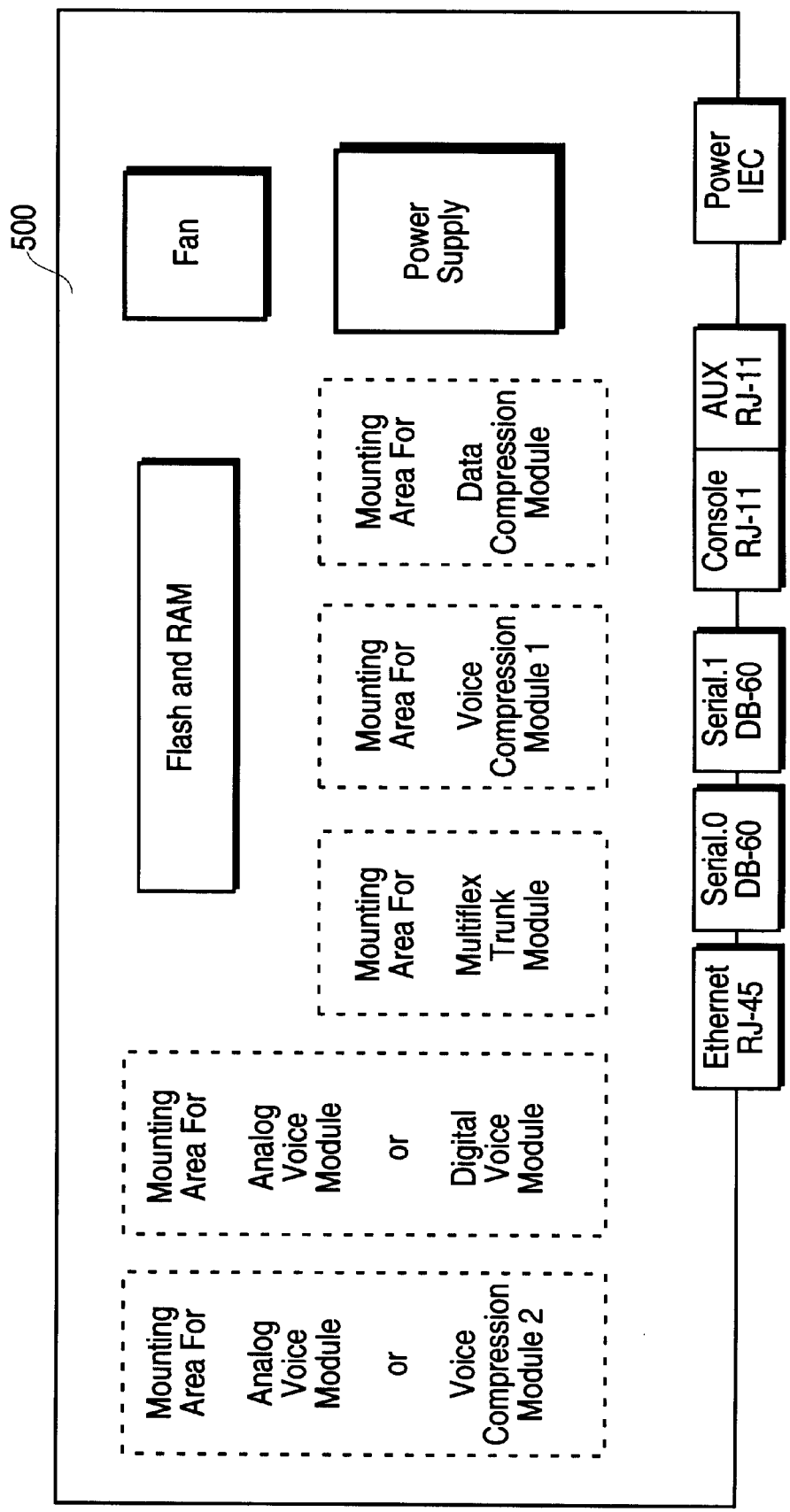
FIG. 5 is a block diagram of a basic configuration of a MAC of an embodiment of the present invention.

FIG. 5 is a block diagram of a basic configuration of a MAC 500 of an embodiment of the present invention. As previously discussed, a number of plug-in modules (PIMs) are supported by the MAC. The PIMs comprise a multiflex trunk module, a digital voice module, an analog voice module, three analog personality modules, a data compression module, and a voice compression module, but the embodiment is not so limited.

The Multiflex Trunk Module (MTM) of an embodiment provides the user with a multiservice T1/E1 trunk with built-in, long-haul CSU/short-haul DSU. The MTM is software configurable to support ANSI T1.403 (T1) or ITU G.703 (E1), but the embodiment is not so limited. Furthermore, the MTM supports connectivity to Frame Relay, ATM, and leased-line carrier services, but the embodiment is not so limited. The MTM derives network timing (clock) and distributes it to the UIOs and DVM. The MTM works in addition to the serial ports and does not preclude the use of either serial port or the Ethernet port.

The MAC of an embodiment supports multiple services of a single T1/E1 interface using a flexible time slot mapping scheme, but the embodiment is not so limited. The trunk may be divided by DS0 groups in a manner that best suits a particular user application. The MAC of one embodiment supports two trunk options, the channelized trunk option and the ATM trunk option, but the embodiment is not so limited.

Figure 6:
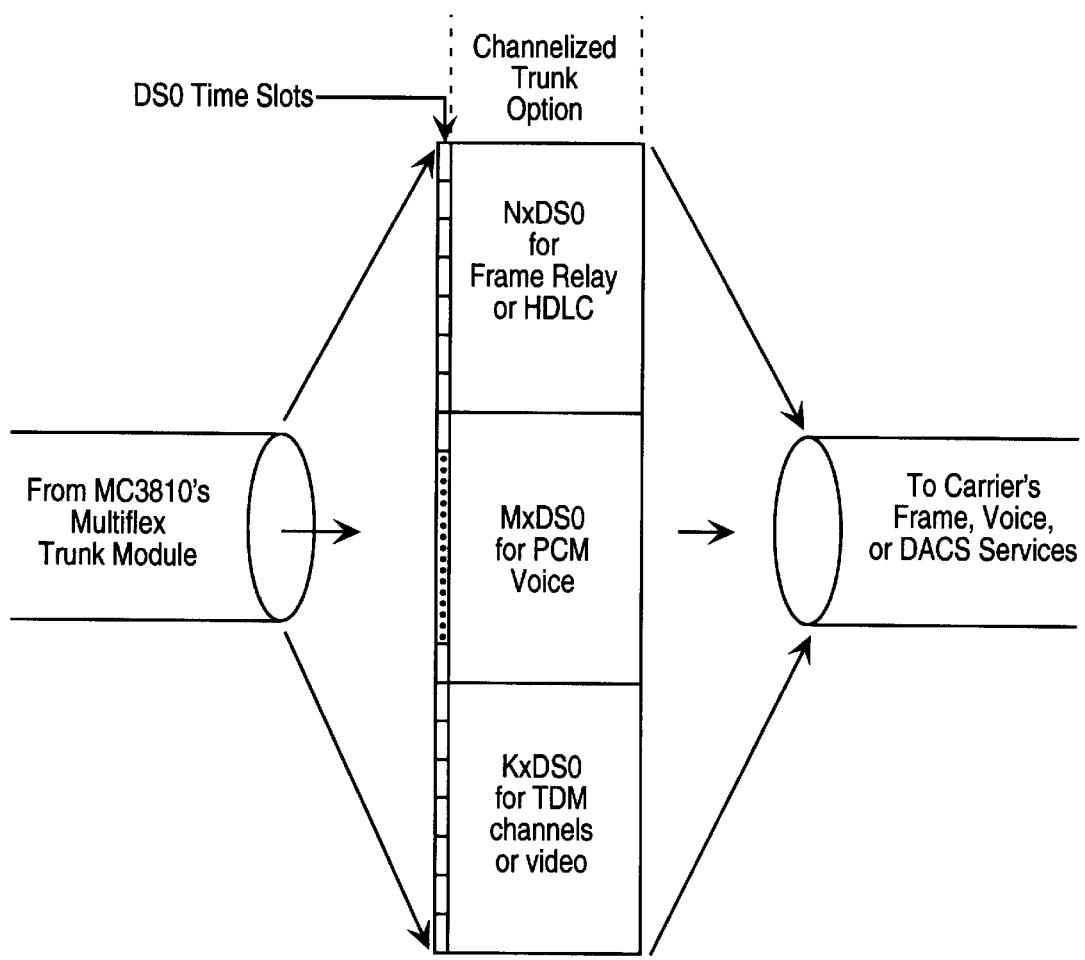
FIG. 6 shows a channelized trunk option of an embodiment of the present invention.

FIG. 6 shows a channelized trunk option of an embodiment of the present invention. The channelized trunk option utilizes the multiservice features of the MTM. The first N time slots are reserved for Frame Relay or HDLC trunk services, but the embodiment is not so limited. Packetized, compressed voice and data is carried within this band of N time slots. The next M time slots may be reserved for PCM voice, but the embodiment is not so limited. The carrier network routes PCM encoded voice on these time slots to their standard PSTN voice network. Lastly, K time slots are reserved for data and/or video transport through a carrier Digital Access and Cross-connect System (DACS) network, but the embodiment is not so limited. These K time slots, traditionally serviced by TDM networks, may be used to provide direct connections for real time data applications, for example, video. Any of the three trunk groups may use all or none of the DS0 time slots. It is noted that the sum of (M+N+K) is less than or equal to 24 for a T1 configuration, and less than or equal to 30 for an E1 configuration, but the embodiment is not so limited.

Figure 7:
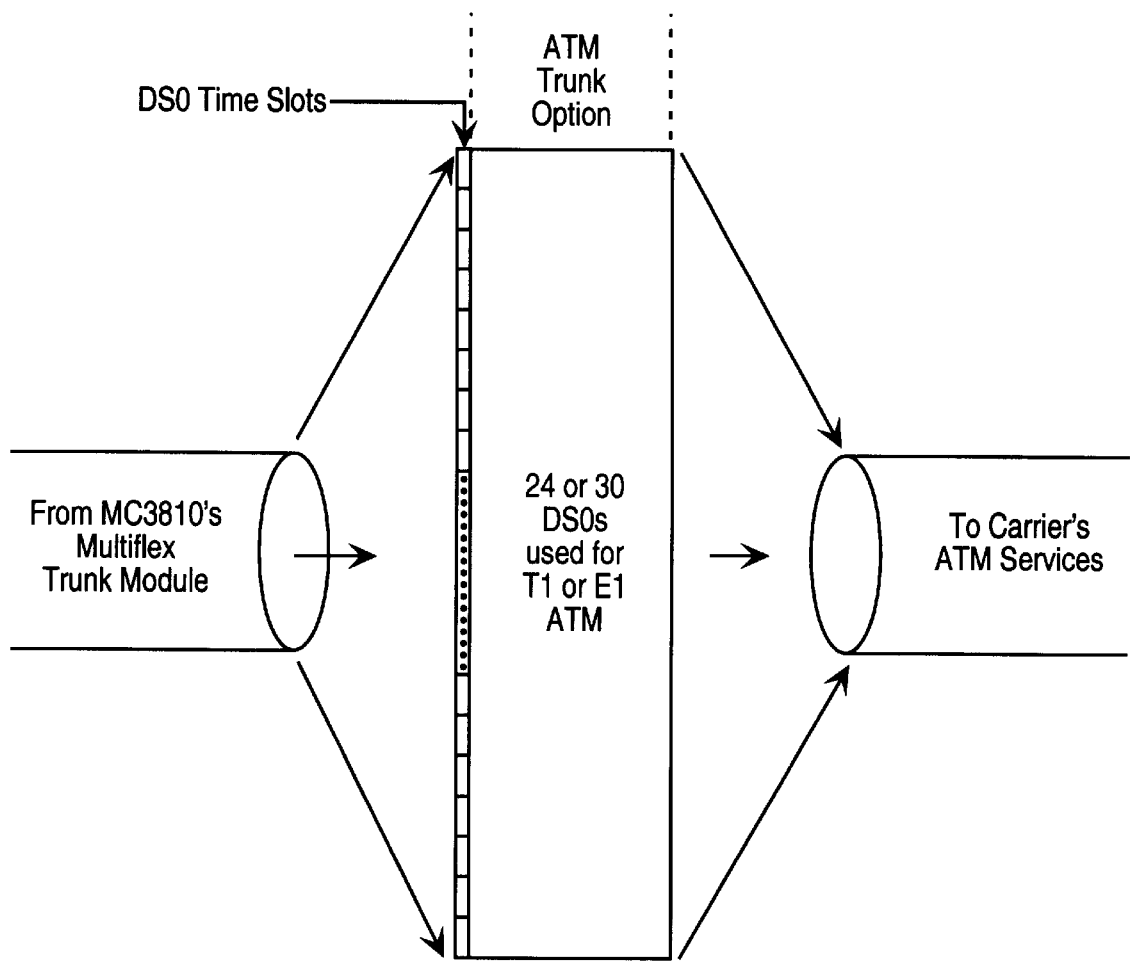
FIG. 7 shows an ATM trunk option of an embodiment of the present invention.

FIG. 7 shows an ATM trunk option of an embodiment of the present invention. The ATM trunk option utilizes the ATM functions of the MAC of one embodiment. In this mode the full T1/E1 is devoted to ATM. Voice connections are made via compressed voice using variable bit rate services. As with the channelized trunk option, multiple services, including LAN and video, may be passed over the ATM trunk.

The DVM of an embodiment provides connectivity to a digital private branch exchange or channel bank. The DVM is functionally equivalent to the MTM, but the embodiment is not so limited. Furthermore, the DVM provides a digital cross-connect function, allowing ingress time slots to be mapped directly to time slots on the out-bound MTM, but the embodiment is not so limited.

Figure 8:
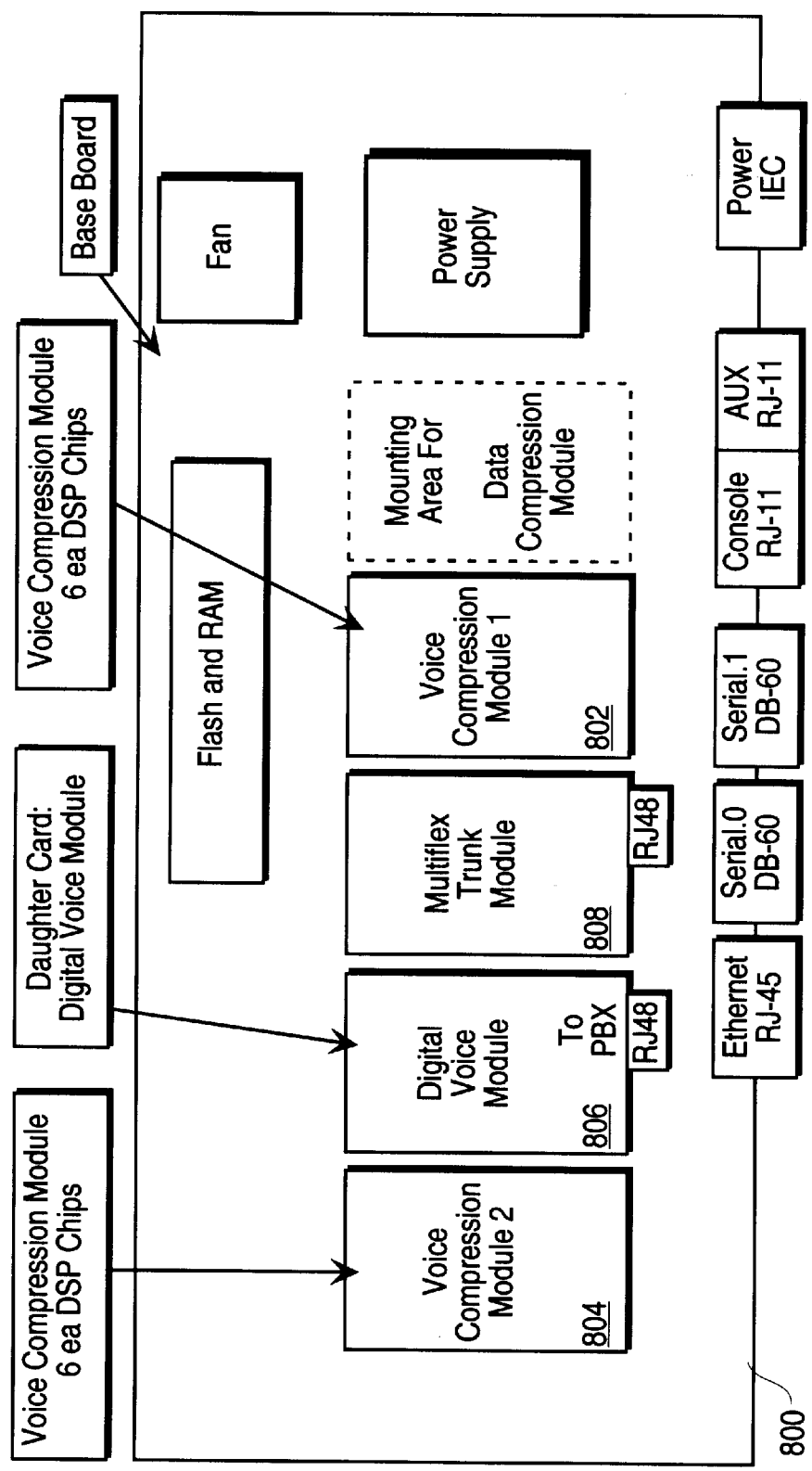
FIG. 8 is a block diagram of a MAC configuration of an embodiment of the present invention comprising digital voice and T1/E1 trunk capabilities.

FIG. 8 is a block diagram of a MAC configuration 800 of an embodiment of the present invention comprising digital voice and T1/E1 trunk capabilities. The MAC digital voice configuration comprises VCM 1 802, VCM 2 804, a DVM 806, and a MTM 808, but the embodiment is not so limited. Each of VCM 1 802 and VCM 2 804 comprises six digital signal processing (DSP) chips, but the embodiment is not so limited. The full digital voice configuration provides 24 compressed voice channels, but the embodiment is not so limited. In one embodiment, a private branch exchange is connected to the DVM 806, wherein voice channels are either mapped into voice compression channels, or mapped directly to PCM time slots allocated on the MTM 808. By using an external channelized device, such as a multiplexer, channel bank, or video codec, data can be mapped into the DVM 806 from outside sources and then directly to the MTM 808. North American Channel Associate Signaling (CAS) and Mercury CAS for the United Kingdom are supported; furthermore, Common Channel Signaling (CCS) is supported, but the embodiment is not so limited.

Figure 9:
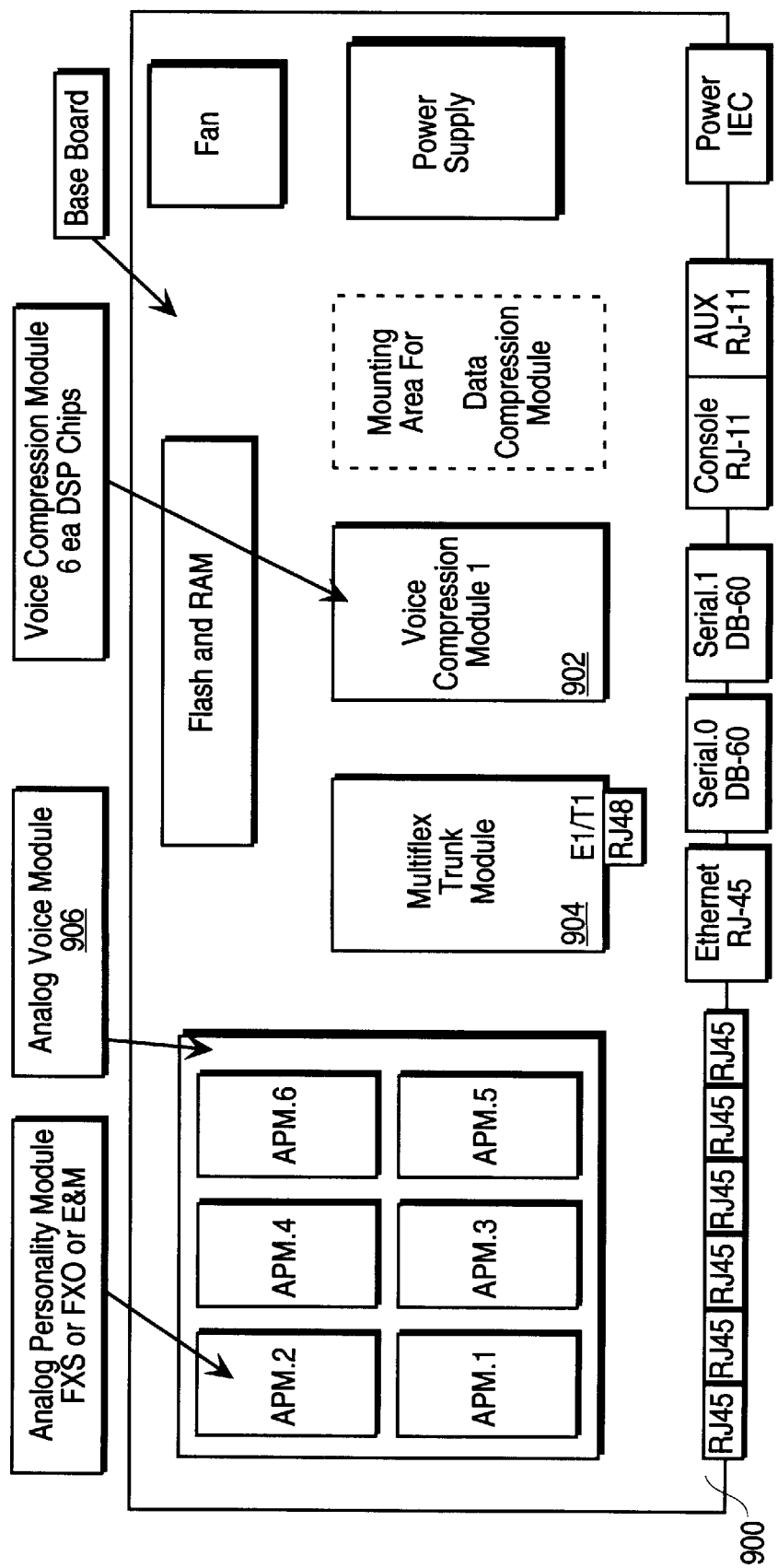
FIG. 9 is a block diagram of a MAC configuration of an embodiment of the present invention comprising analog voice and T1/E1 trunk capabilities.

The AVM of an embodiment provides six analog voice interfaces, but the embodiment is not so limited. The interfaces may be used with analog telephones, key systems, and private branch exchanges. FIG. 9 is a block diagram of a MAC configuration 900 of an embodiment of the present invention comprising analog voice and T1/E1 trunk capabilities. The MAC analog voice configuration comprises VCM 1 902, a MTM 904, and an AVM 906, but the embodiment is not so limited. The AVM 906 provides headers for mounting up to six Analog Personality Modules (APMs), but the embodiment is not so limited. An interface is activated when the user installs the desired style of APM on the AVM 906, wherein the desired style comprises FXS, FXO, and E&M, but the embodiment is not so limited. The AVM/APM combination provides, but is not limited to, the following features: six ports of FXS, FXO or E&M, in any combination; integrated talk battery and ring generator; adjustable transmit and receive levels; 2-wire FXS/FXO voice interface; 2 and 4 wire E&M interface; Wink Start, Immediate Start, & Delayed Start; software configurable ground start, loop start, or battery reversing signaling; software configurable a-law or mu-law PCM encoding; and, software configurable impedance. The VCM 1 902 comprises six DSP chips, but the embodiment is not so limited.

The APMs comprise FXO, FXS, and E&M signaling modules that are mounted on the AVM 906. The APMs comprise the codec that digitizes the voice into PCM samples, wherein the PCM samples are passed to the voice compression services. Furthermore, in one embodiment, FXS ports supply battery and connect to a telephone, FXO ports receive battery and connect to a central office trunk, and E&M ports connect to analog line cards on private branch exchanges, but the embodiment is not so limited.

In supporting voice channels, one embodiment of the MAC connects to the following types of telephone systems, but the embodiment is not so limited: analog telephone set via 2 wire connections; analog private branch exchange via 2 or 4 wire interface; key system via 2 or 4 wire connection; digital private branch exchange via T1/E1. Furthermore, signaling translation among FXS, FXO, and E&M types is supported on both the analog and digital interfaces.

The MAC of an embodiment uses several techniques to ensure near toll-quality voice when using public Frame Relay networks. These techniques comprise, but are not limited to, CS-ACELP voice compression, priority queuing, packet segmentation, and dynamic jitter control. Many of these techniques are inherent in ATM in some form. Therefore, when using an ATM trunk, the ATM Quality of Service (QOS) parameters, traffic shaping, and guaranteed cell size provide service guarantees.

Priority queuing ensures that frames in outbound voice queues are serviced before data traffic. The MAC of an embodiment supports two service classes, real time and non-real time, but the embodiment is not so limited. The real time class is used for voice and video, and the non-real time class is used for data, but the embodiment is not so limited. Real time virtual channel queues are serviced in a round-robin fashion, and they are completely emptied before any non-real time channel queues are serviced. Non-real time virtual channel queues are serviced when there are no real time cells in the queues. Data channel queues are also serviced in a round-robin fashion. It is noted that data channels of an embodiment are not completely locked out if voice and video are present.

The voice capabilities of an embodiment of the MAC are closely tied to the trunk options, but the embodiment is not so limited. The MAC of an embodiment supports a serial trunk option, a multiflex trunk option, and an ATM trunk option, but the embodiment is not so limited.

Figure 10:
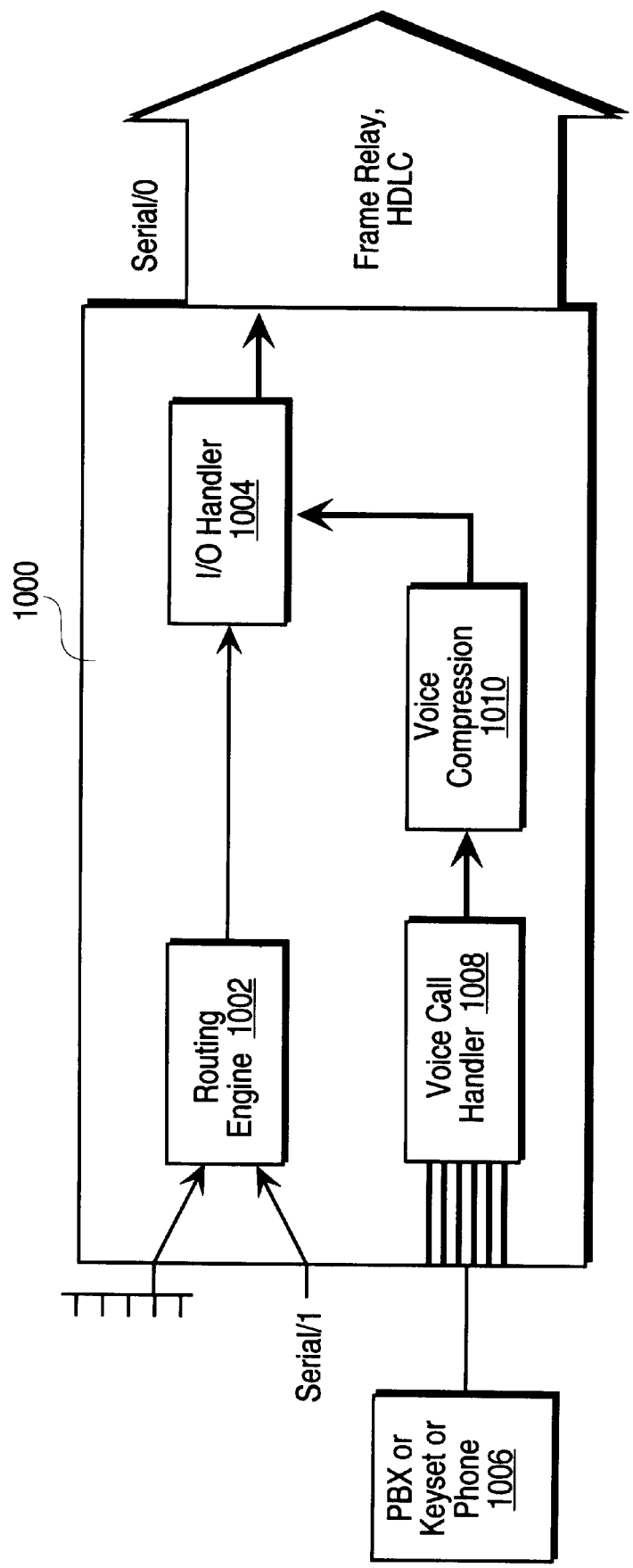
FIG. 10 shows the data and voice flows when using a serial port as a network interface in an embodiment of the MAC of the present invention.

FIG. 10 shows the data and voice flows when using a serial port as a network interface in an embodiment of the MAC 1000 of the present invention. Data is received into a routing engine 1002 and passed to an I/O handler 1004. Voice channels are received from a private branch exchange, keyset, or telephone 1006. The received voice channels are routed to a voice call handler 1008, a voice compression engine 1010, and to an I/O handler 1004. The I/O handler 1004 couples the data and voice to serial port 0 as the network interface.

Figure 11:
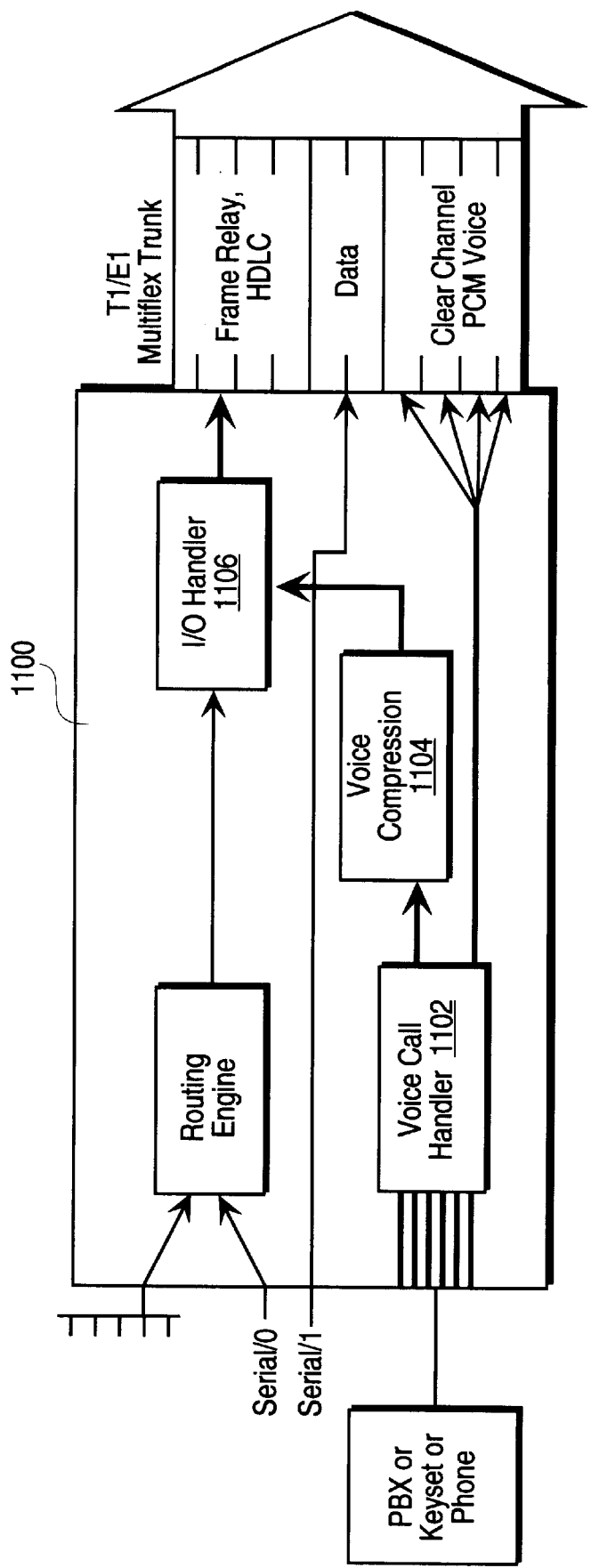
FIG. 11 shows the voice handling capability when using the multiflex trunk in an embodiment of the MAC of the present invention.
Figure 12:
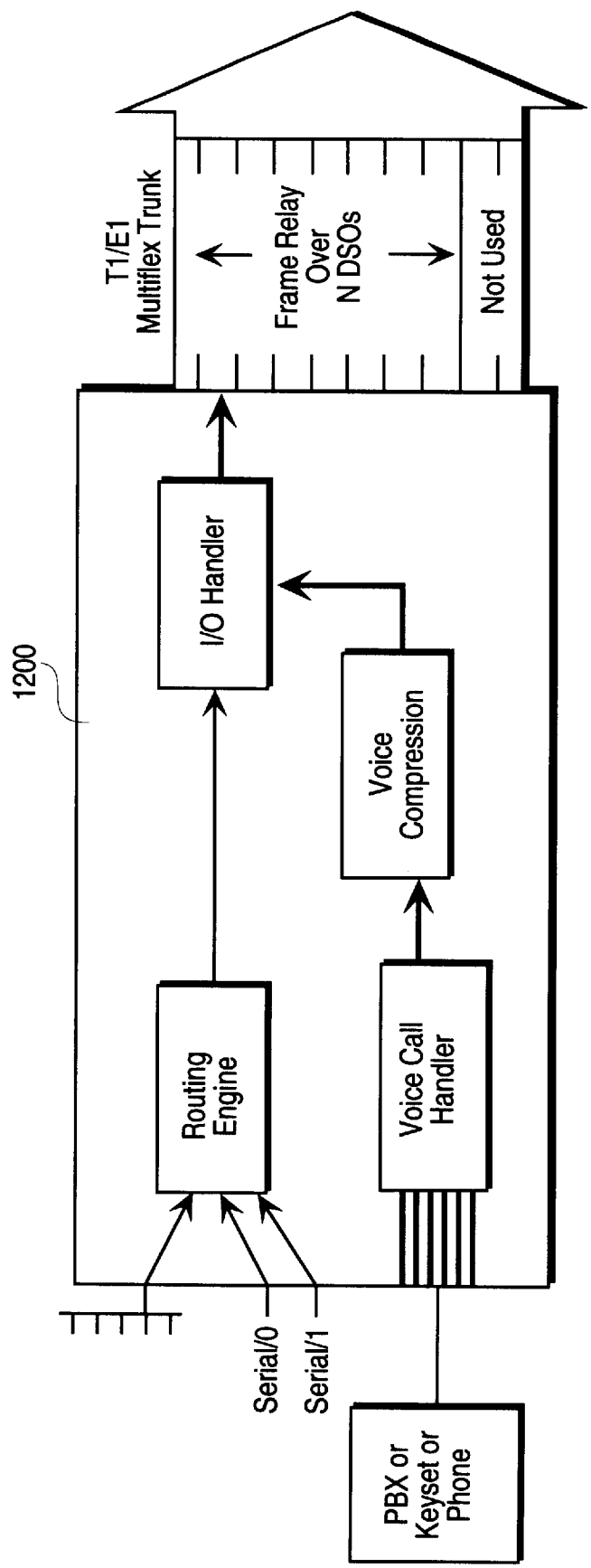
FIG. 12 shows the voice handling capability when using the T1/E1 multiflex trunk partially or entirely for Frame Relay in an embodiment of the MAC of the present invention.

FIG. 11 shows the voice handling capability when using the multiflex trunk in an embodiment of the MAC 1100 of the present invention. Using this configuration, voice calls are routed through the voice call handler 1102. When the channel is configured for TDM cross connect, the call is routed directly to the T1/E1 trunk, bypassing the voice compression engine 1104. The carrier can then, within its DACS network, peel off the PCM channels and route them to the PSTN. The TDM cross connect function is available when the DVM is used for access to a private branch exchange, but the embodiment is not so limited. When the voice calls are configured to be compressed, the bit stream is passed to the voice compression engine, or sub-system, and then to the I/O handler 1106. The I/O handler 1106 encapsulates the voice in Frame Relay or HDLC and then passes the encapsulated voice to the trunk, but the embodiment is not so limited. FIG. 12 shows the voice handling capability when using the T1/E1 multiflex trunk partially or entirely for Frame Relay in an embodiment of the MAC 1200 of the present invention.

Figure 13:
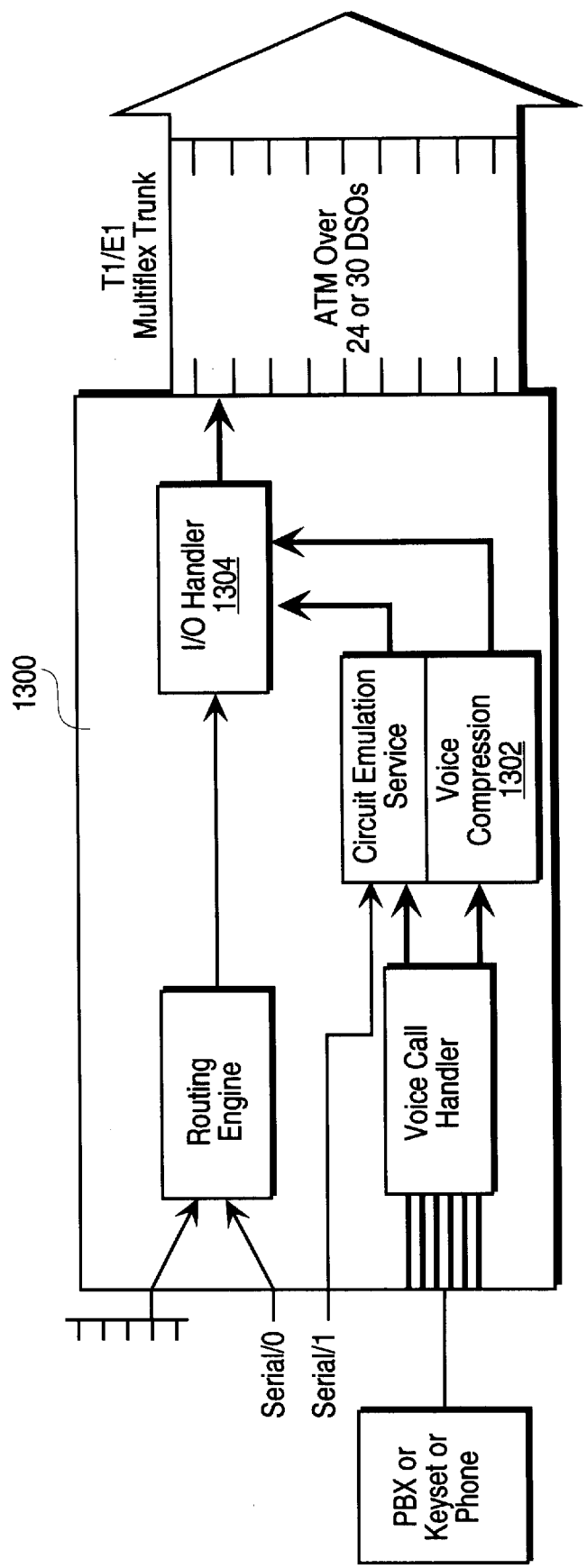
FIG. 13 shows the voice handling capability when using the ATM trunk in an embodiment of the MAC of the present invention.

FIG. 13 shows the voice handling capability when using the ATM trunk in an embodiment of the MAC 1300 of the present invention. Using this configuration, voice calls first go through the voice compression engine 1302 and are subsequently passed to the I/O handler 1304. The cells are then placed in a variable bit rate stream, but the embodiment is not so limited. A VCM performs voice compression, echo cancellation, silence suppression, and DTMF detection. The DTMF tones are passed through and are not locally emulated across a network connection, but the embodiment is not so limited.

In providing packetized voice, the MAC of an embodiment provides for the transport of compressed voice using data link formats comprising Frame Relay, ATM, and HDLC. The multiplexing of different types of traffic comprising voice, data, and facsimile, is provided over a single Frame Relay permanent virtual circuit (PVC). This feature reduces the cost of the Frame Relay network by reducing the number of PVCs required over each link. If desired, users may configure voice and data on different PVCs.

The MAC of an embodiment transports compressed voice over ATM trunks in an ATM Adaptation Layer 5 (AAL5) format, but the embodiment is not so limited. The AAL5 format is used because of a more streamlined encapsulation, and because it can be used to support silence suppression, producing a variable bit rate stream, but the embodiment is not so limited. The MAC of an embodiment uses HDLC encapsulation to combine voice and data over private, leased line networks, but the embodiment is not so limited.

The MAC of an embodiment supports pass-through voice, wherein channels from the DVM are mapped directly to time slots on the T1/E1 trunk. This TDM capability can significantly reduce access charges by permitting users to combine voice and data traffic onto a single T1 or E1 trunk. This capability provides excellent flexibility to provision voice channels directly to a PSTN.

The MAC of an embodiment supports facsimile relay services, wherein the bandwidth required over a WAN connection is reduced from 64 kbps to 9,600 bps, but the embodiment is not so limited. Furthermore, facsimile over IP is supported for communicating facsimiles among locations that are reachable over the Internet. The MAC of an embodiment further supports modem traffic by using a TDM pass-through channel coupled from a private branch exchange. The pass-through channel passes through the DVM to a dedicated channel on the multiflex trunk.

The MAC of an embodiment supports call types comprising, but not limited to, local connection, on-net connection, on-net failed switching to off-net connection, auto-dial connection, private branch exchange tie-line connection, off-net connection, and auto-connection. The MAC, in providing voice services, supports a wide range of call management configurations comprising configurations for dialing on-net extensions, off-net numbers, and local calls, but the embodiment is not so limited. The MAC supports call set-up options comprising, but not limited to: on-net dialing; auto-dial, or private line automatic ringdown (PLAR); off-net dialing; and, tandem switching.

The MAC of an embodiment supports on-net dialing when a call originator dials an extension by entering a phone number; the call is connected within the wide area network. For on-net calls, a flexible call numbering plan allows dialing to any port on any system in the network by dialing a unique prefix that identifies the port or group of ports on the destination system, wherein the destination system ports are called a trunk-group. When the remote port is connected to a private branch exchange, either analog or digital, that port may be configured to request extra digits from the originator. The extra digits are passed on to the private branch exchange which will use them to connect the call to the correct extension. Call routing is supported via a static mapping table in each MAC, but the embodiment is not so limited.

The MAC of an embodiment supports PLAR, but the embodiment is not so limited. The PLAR is supported with a MAC configured so that an off-hook condition at one extension causes the associated MAC to automatically dial another extension elsewhere in the network.

The MAC of an embodiment supports off-net dialing, wherein when a caller dials î, or another pre-programmed digit/digits, the MAC automatically connects the caller extension to a channel connected directly to a PSTN. In one embodiment, off-net calls are made by dialing a trunk group identifier that tells the MAC of one embodiment to select a specific trunk-side port or group of ports that are configured as pass-through connections to the PSTN, but the embodiment is not so limited. Furthermore, the placement of calls from one channel to another on the same MAC is supported. This feature provides private branch exchange functionality at non-private branch exchange sites. Moreover, incoming calls on pass-through channels are configured to connect to specific voice ports on the MAC of one embodiment. This functionality provides a way for a facsimile machine connected to an analog port to be used for both on-net and off-net calls.

The MAC of an embodiment supports tandem switching in order to control network line costs, but the embodiment is not so limited. Tandem switching allows a call to transit through one MAC without requiring the call to be decompressed and routed through the private branch exchange. This maintains voice quality and reduces the number of PVCs needed to mesh a network. Tandem switch routes are stored in a static table and are defined by the user; however, the tandem switch table supports the use of wild card entries to facilitate building large, structured dial plans.

The MAC of an embodiment supports video transport using three modes, wherein the modes comprise a TDM video mode, an ATM circuit emulation services (CES) mode, and a LAN-based video over Internet Protocol (IP) mode, but the embodiment is not so limited.

The TDM mode of the MAC of an embodiment uses the Multiflex Trunk Module (MTM), but the embodiment is not so limited. In using the TDM mode, a video codec is connected to a UIO port and video is transported via a group of DSOs on the trunk. A carrier then transports this bit stream across the DACS network to another MAC.

The ATM CES mode of the MAC of an embodiment uses the MTM, but the embodiment is not so limited. In using the ATM CES mode, a video codec is connected to a UIO port and video is transported using ATM Adaptation Layer 1 (AAL1) circuit emulation describing some user defined group of DSOs.

The LAN-based video over IP mode of the MAC of an embodiment receives packetized video from IP/TV or other video-over-IP solutions in the Ethernet port of the MAC, but the embodiment is not so limited. The MAC routes the received packetized video across an associated network.

Management and configuration of the MAC of one embodiment is designed to be compatible with existing network router management systems. As such, three types of configuration interfaces are provided, wherein the configuration interfaces comprise a command line interface, a Hypertext Transfer Protocol (HTTP)-based configuration server, and a Simple Network Management Protocol (SNMP)-based Management Information Base (MIB), but the embodiment is not so limited.

In the operation of routing integrated traffic comprising data, voice, and video traffic, at least one data stream, at least one voice channel, and at least one video stream are received. Furthermore, the received information comprises Local Area Network (LAN)-based traffic and facsimile traffic. The received data stream is packetized. Software-based and hardware-based compression and encryption of the data stream are provided, but the embodiment is not so limited. Compression and decompression of the voice channel are provided, as well as echo cancellation, but the embodiment is not so limited. The video stream comprises circuit and packet mode video, wherein the circuit mode video is transported bit-by-bit through circuit emulation using a constant bit rate ATM connection, wherein the packet mode video is transported using a variable bit rate ATM connection, but the embodiment is not so limited.

The packetized data stream is multiplexed with the voice channel and the video stream to form an integrated transport stream. The integrated transport stream is provided to at least one multi-service network using a configurable trunk. The multi-service network includes cell-based and packet-based networks comprising Asynchronous Transfer Mode (ATM), Frame Relay, High-level Data Link Control (HDLC), Internet Protocol (IP), and Time Division Multiplex (TDM) networks, as well as leased-line carrier services. The trunk is configured at a physical level and a protocol level using at least one trunk option, wherein configuring comprises using software to configure the trunk among a number of service connections and allocate a plurality of trunk channels and time slots among at least one multi-service network connection. A first trunk option comprises a structured or channelized trunk option comprising time slot mapping, and a second trunk option comprises an ATM trunk option, but the embodiment is not so limited. In one embodiment a real time service class and a non-real time service class are provided, but the embodiment is not so limited. The real time service class is used for the voice channel and the video stream, wherein the non-real time service class is used for the data stream.

Figure 14:
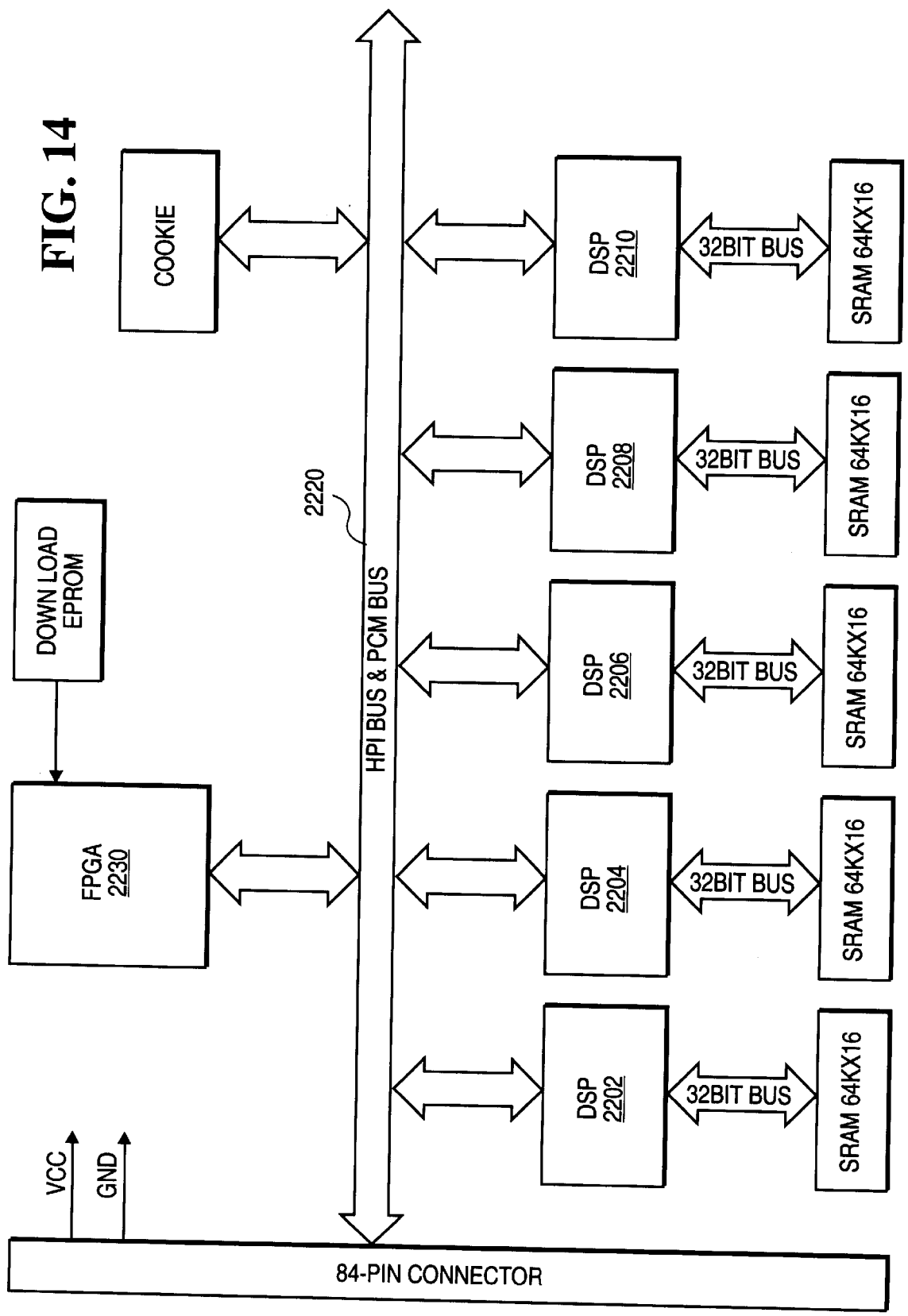
FIG. 14 is a Voice Compression Module of a MAC of an embodiment of the present invention.

FIG. 14 is a Voice Compression Module of a MAC of an embodiment of the present invention. As previously discussed herein, the VCM comprises a circuit card containing multiple DSPs 2202–2210 coupled to a PCM bus 2220, but the embodiment is not so limited. Each DSP can run either two channels of G.729a ACELP, or one channel of G.729 ACELP, but the embodiment is not so limited. Each DSP is programmed to take two timeslots from the voice PCM bus 2220 by programming a connection bit map device. The connection bit map device of one embodiment is provided by a field programmable gate array (FPGA) circuit 2230, but the embodiment is not so limited.

The DSP devices of the MAC of an embodiment support synchronous serial port interfaces comprising standard synchronous serial port, buffered serial port (BSP), and TDM serial port, but the embodiment is not so limited. The standard synchronous serial port provides a full-duplex communication with serial devices such as codecs and A/D converters. The BSP features a buffering mechanism that greatly reduces the CPU overhead in handling serial data transfers. Except for the buffering mechanism, the BSP functions in a similar manner to the synchronous serial port. The TDM serial port allows the DSP device to communicate serially with up to 7 other devices, but the embodiment is not so limited.

The MAC of an embodiment comprises a TDM interface designed for an environment comprising multiple DSPs.

Figure 15:
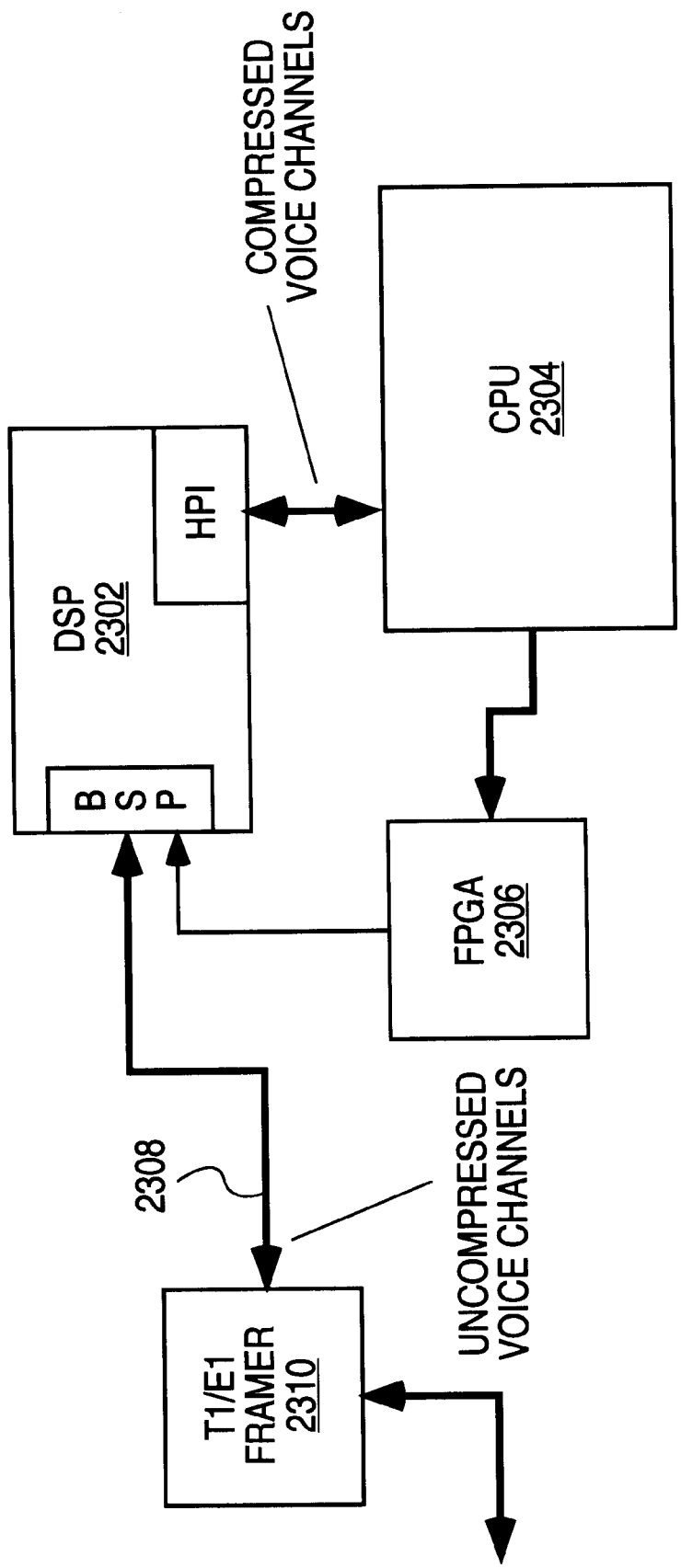
FIG. 15 is a TDM interface of an embodiment of the present invention.
Figure 16:
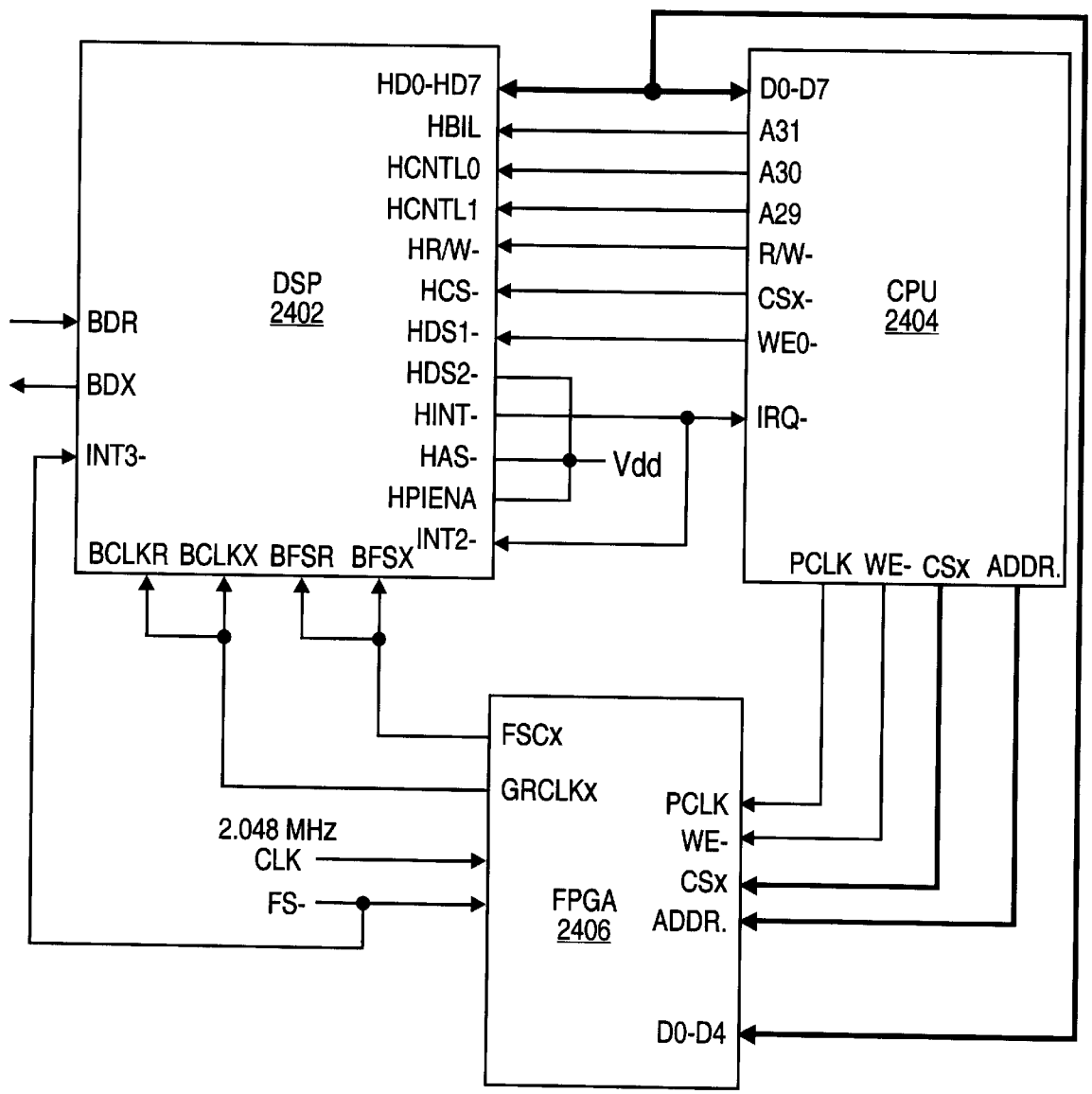
FIG. 16 shows the hardware interconnection of a TDM interface of an embodiment of the present invention.

FIG. 15 is a TDM interface of an embodiment of the present invention. The interface, used in a voice over Frame Relay application, allows for communication among multiple DSPs 2302 coupled among a CPU 2304, an FPGA 2306, a PCM bus 2308 and a T1/E1 framer 2310, but the embodiment is not so limited. The CPU 2304 determines the voice channel that will be compressed/decompressed by a DSP 2302, using a pre-determined voice coding scheme. FIG. 16 shows the hardware interconnection of a TDM interface of an embodiment of the present invention. In an embodiment, the interface comprises at least one DSP 2402 coupled to a CPU 2404 and an FPGA 2406, but the embodiment is not so limited.

In providing a TDM interface among a high-speed data stream and multiple processors of an embodiment of the present invention, a dynamic association is established and maintained among a number of processors and a number of voice channels of a data stream. The voice channels are multiplexed voice channels received in a Pulse Code Modulation (PCM) data stream, but the embodiment is not so limited. The processors comprise digital signal processors (DSPs) for performing compression and decompression of the plurality of voice channels, but the embodiment is not so limited. A table is generated that tracks the association among the plurality of processors and the plurality of voice channels. At least one signal is generated that synchronizes a transfer of data among each of the processors and the associated voice channels. The generation of at least one signal comprises providing a frame synchronization signal to each of the processors to indicate the start of a first voice channel. Furthermore, a byte synchronization signal is provided to each processor when the associated voice channel is available for transfer. Moreover, a gating clock signal is provided to each of the processors when the associated voice channel is available for transfer. A number of compressed voice channels are provided to at least one multi-service network using a configurable trunk, wherein the at least one multi-service network comprises Asynchronous Transfer Mode (ATM), Frame Relay, High-level Data Link Control (HDLC), Internet Protocol (IP), and TDM networks.

The TDM interface of an embodiment performs several functions in the dynamic allocation of DSPs among PCM channels, or time slots. The TDM interface indicates a start of Channel 0 by connecting the T1/E1 frame sync to the interrupt pin on a DSP, wherein the start of channel 0 is indicated. The T1/E1 frame sync comprises the system frame sync, but the embodiment is not so limited. Coupling the system frame sync to a hardware DSP interrupt enables the DSP to identify the beginning of every frame. Furthermore, the TDM interface synchronizes the DSP to a T1 clock (1.544 MHz) or an E1 clock (2.048 MHz) by clocking a serial port of the DSP at the appropriate clock rate. Moreover, the TDM interface selects a PCM bus time slot for the corresponding DSP by writing the value of the time slot, or channel number, to a designated address in a glue logic circuit, but the embodiment is not so limited. In the MAC of one embodiment, the PCM bus time selection is accomplished by the CPU, but the embodiment is not so limited.

In identifying the beginning of each frame, or the start of Channel 0, the sending end of the multiplexed stream adds framing information. The framing information may comprise a single bit, a code word of the same length as the other channels in the frame, a pre-determined pattern, and a deletion or alteration of a bit in the code word, but the embodiment is not so limited. The schemes that are generally used in the telephone network add either one bit or one code word (8 bits) to the data stream to identify frame boundaries.

The MAC of an embodiment provides for flexible management of DSP resources, wherein offhook states of extended duration are detected using a busy-out condition and committed DSP resources are freed up and returned to an available pool. Furthermore, the flexible DSP management used in the MAC accommodates dynamic fragmentation and defragmentation.

Figure 17:
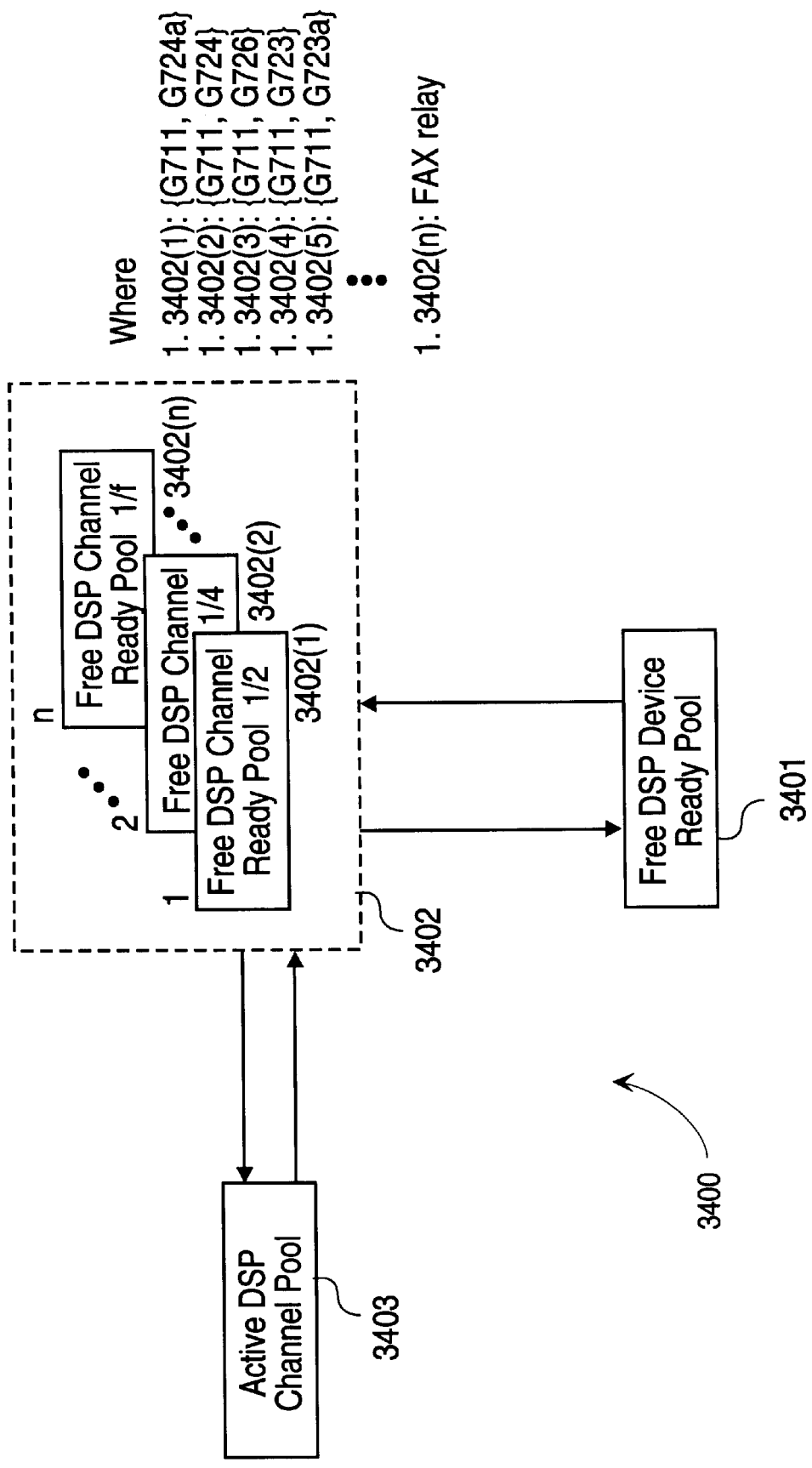
FIG. 17 is a block diagram of a resource manager for dynamic allocation of multiple DSP resources among multiple channels in voice over packet-data-network systems (VOPS) of an embodiment of the present invention.

FIG. 17 is a block diagram of a resource manager 3400 for dynamic allocation of multiple DSP resources among multiple channels in voice over packet-data-network systems (VOPS) of an embodiment of the present invention. The resource manager 3400 comprises a free DSP device ready pool 3401, a free DSP channel ready pool 3402, and an active DSP channel pool 3403, but the embodiment is not so limited. Before the MAC voice subsystem is placed in service and before any DSP resources are allocated, all logical DSP channels of a MAC reside in the free DSP device ready pool 3401. The free DSP device ready pool 3401 is a pool of unfragmented DSP devices comprising contiguous channels that are ready for a DSP manager to allocate. The free DSP channel ready pool 3402 is a depository of unused DSP channels due to fragmentation of a DSP device. The free DSP channel ready pool 3402 of one embodiment comprises N pools 3402(N), but the embodiment is not so limited. In one embodiment, each free DSP channel ready pool 3402(1)–3402(5) comprises two voice channels, wherein the voice channels comprise G.711, G.723, G.723a, G.726, G.729, and G.729a ACELP, and free DSP channel ready pool 3402($n$) comprises one facsimile channel, but the embodiment is not so limited. The active DSP channel pool 3403 comprises currently active DSP channels.

A further example of the use of the MAC resource manager is in the handling of a busy-out condition. In operation, a MAC of an embodiment of the present invention may be coupled to a private branch exchange, channel bank, and T1/E1 line, wherein the customer may not use all available ports of the coupled device. A seizure signal may be asserted on the unused ports of the private branch exchange, channel bank, or T1/E1 line to make the unused ports appear busy. The MAC of an embodiment reacts to the seizure signal as a request to place a call and commits MAC resources to the call. A busy-out condition of the MAC of an embodiment causes the seizure signal to be timed-out based on a preconfigured duration, but the embodiment is not so limited. Upon time-out, the prior committed MAC resources are returned to the free DSP channel ready pool 3402 and the free DSP device ready pool 3401 by the MAC resource manager, but the embodiment is not so limited.

In providing for dynamic allocation of multiple DSP resources among multiple channels in voice over packet-data-network systems (VOPS) of an embodiment of the present invention, a representation is established among at least one signal processing device and multiple logical channels. The signal processing devices comprise digital signal processors (DSPs). The logical channels are placed into a first resource pool. At least one logical channel is moved among at least one other resource pool in response to a request to process at least one call received over a voice over packet-data-network system (VOPS). The VOPS comprises voice over Internet Protocol (IP) network systems, voice over Frame Relay network systems, voice over Asynchronous Transfer Mode (ATM) network systems, and voice over High-level Data Link Control (HDLC) network systems, but the embodiment is not so limited. The other resource pools comprise a second resource pool and a third resource pool, but the embodiment is not so limited. The second resource pool of one embodiment comprises unused logical channels due to fragmentation of a signal processing device, and the third resource pool comprises active logical channels.

The call is processed using the signal processing device associated with the corresponding logical channel. In one embodiment, a first logical channel is placed into a third resource pool in response to a received first voice call, wherein the first voice call is processed using the DSP associated with the first logical channel. A second logical channel is placed into a second resource pool in response to the first voice call, wherein the first logical channel and the second logical channel are associated with a first DSP. The second logical channel of the second resource pool is moved into the third resource pool in response to a received second voice call, wherein the second voice call is processed using the DSP associated with the second logical channel.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for controlling the transmission of cells through a network, comprising the steps of:
   allocating at least one cell stream to at least one cell slot of a cell scheduling table;
   designating a cell slot and a corresponding cell stream in response to at least one signal generated following cell transmission;
   maintaining at least one counter and at least one credit buffer;
   determining a service class of the designated cell stream;
   transmitting a cell of the designated cell stream in response to the determined service class and a count of the at least one counter and contents of the at least one credit buffer; and
   controlling cell transmission timing using the at least one signal.

2. The method of claim 1, wherein the step of transmitting comprises the step of transmitting a cell of the designated cell stream when the service class is determined to be constant bit rate (CBR).

3. The method of claim 1, wherein the step of maintaining at least one counter comprises the steps of:
   maintaining an individual counter for each cell stream, wherein the individual counter increments following each transmission of a cell of the corresponding cell stream; and
   maintaining a global counter, wherein the global counter increments following each transmission of a cell.

4. The method of claim 1, wherein the step of transmitting comprises the steps of:
   generating a credit buffer for each cell stream for which the service class is determined to be variable bit rate (VBR), wherein a size of the credit buffer is determined by a maximum burst cell size (MBC) of the corresponding cell stream and virtual circuit (VC); and
   grouping the credit buffers along with the corresponding cell streams in at least one group according to quality of service (QOS) parameters.

5. The method of claim 4, wherein the step of transmitting further comprises the steps of:
   determining whether the MBC has been exceeded for the designated cell stream;
   incrementing the credit buffer of the designated cell stream in response to a determination that the MBC has not been exceeded, wherein cell credit is accumulated based on a sustained cell rate (SCR) of the designated cell stream;
   determining a counter difference by subtracting the individual counter associated with the designated cell stream from the value of the global counter;
   transmitting a cell of the designated cell stream when the counter difference equals an inverse of a peak cell rate (PCR) and the credit buffer of the designated cell stream contains credit, wherein transmission of the cell of the designated cell stream is based on the accumulated cell credit; and
   decrementing the credit buffer of the designated cell stream in response to cell transmission, wherein cell credit is consumed upon cell transmission.

6. The method of claim 5, further comprising the step of bursting cell transmission to a peak cell rate (PCR) until credit is exhausted.

7. The method of claim 1, further comprising the step of transmitting idle cells when user data is unavailable for transmission.

8. The method of claim 1, wherein the network comprises Asynchronous Transfer Mode (ATM), Frame Relay, High-level Data Link Control (HDLC), Internet Protocol (IP), and Time Division Multiplexed (TDM) networks, wherein the network uses service connections comprising T1 connections.

9. The method of claim 1, wherein the at least one signal is generated by at least one ATM layer upon cell transmission to serve as a clock signal to control a traffic shaping scheduler to control the sustained cell rate (SCR), peak cell rate (PCR), and MBC of an ATM network.

10. The method of claim 1, further comprising the steps of:
    determining the number of cell slots using an ATM line rate; and
    reserving at least one cell slot based on a sustained cell rate (SCR) of a virtual circuit (VC) cell stream relative to a bandwidth of the network.

11. The method of claim 1, wherein the at least one cell stream comprises integrated traffic comprising data, voice, video, facsimile, and Local Area Network (LAN)-based traffic.

12. An apparatus for controlling the transmission of cells through a network, the apparatus comprising:
    at least one processor;
    an input coupled to the at least one processor, the input capable of receiving cells, the at least one processor configured to,
       allocate at least one cell stream to at least one cell slot of a cell scheduling table;
       designate a cell slot and a corresponding cell stream in response to at least one signal generated following cell transmission;
       maintain at least one counter and at least one credit buffer;
       determine a service class of the designated cell stream;
       transmit a cell of the designated cell stream in response to the determined service class and a count of the at least one counter and contents of the at least one credit buffer; and control cell transmission timing using the at least one signal;

an output coupled to the at least one processor, the output capable of providing transmitted cells.

13. The apparatus of claim 12, wherein the transmission of a cell comprises transmitting a cell of the designated cell stream when the service class is determined to be constant bit rate (CBR).

14. The apparatus of claim 12, wherein maintaining at least one counter comprises:

maintaining an individual counter for each cell stream, wherein the individual counter increments following each transmission of a cell of the corresponding cell stream; and maintaining a global counter, wherein the global counter increments following each transmission of a cell.

15. The apparatus of claim 12, wherein the transmission of a cell comprises:

generating a credit buffer for each cell stream for which the service class is determined to be variable bit rate (VBR), wherein a size of the credit buffer is determined by a maximum burst cell size (MBC) of the corresponding cell stream and virtual circuit (VC); and grouping the credit buffers along with the corresponding cell streams in at least one group according to quality of service (QOS) parameters.

16. The apparatus of claim 15, wherein the transmission of a cell further comprises:

determining whether the MBC has been exceeded for the designated cell stream;

incrementing the credit buffer of the designated cell stream in response to a determination that the MBC has not been exceeded, wherein cell credit is accumulated based on a sustained cell rate (SCR) of the designated cell stream;

determining a counter difference by subtracting the individual counter associated with the designated cell stream from the value of the global counter;

transmitting a cell of the designated cell stream when the counter difference is greater than or equal to an inverse of a peak cell rate (PCR) and the credit buffer of the designated cell stream contains credit, wherein transmission of the cell of the designated cell stream is based on the accumulated cell credit; and decrementing the credit buffer of the designated cell stream in response to cell transmission, wherein cell credit is consumed upon cell transmission.

17. The apparatus of claim 16, wherein the at least one processor is further configured to control the apparatus to burst cell transmission to a peak cell rate (PCR) until credit is exhausted.

18. The apparatus of claim 12, wherein the network comprises Asynchronous Transfer Mode (ATM), Frame Relay, High-level Data Link Control (HDLC), Internet Protocol (IP), and Time Division Multiplexed (TDM) networks, wherein the network uses service connections comprising T1 connections.

19. The apparatus of claim 12, wherein the at least one signal is generated by at least one ATM layer upon cell transmission to serve as a clock signal to control a traffic shaping scheduler to control the sustained cell rate (SCR), peak cell rate (PCR), and MBC of an ATM network.

20. The apparatus of claim 12, wherein the at least one processor is further configured to control the apparatus to:

determine the number of cell slots using an ATM line rate; and reserve at least one cell slot based on a sustained cell rate (SCR) of a virtual circuit (VC) cell stream relative to a bandwidth of the network.

21. The apparatus of claim 12, wherein the at least one cell stream comprises integrated traffic comprising data, voice, video, facsimile, and Local Area Network (LAN)-based traffic.

22. A computer readable medium containing executable instructions which, when executed in a processing system, causes the system to perform the steps of a method for controlling the transmission of cells through a network, the method comprising the steps of:

allocating at least one cell stream to at least one cell slot of a cell scheduling table;

designating a cell slot and a corresponding cell stream in response to at least one signal generated following cell transmission;

maintaining at least one counter and at least one credit buffer;

determining a service class of the designated cell stream;

transmitting a cell of the designated cell stream in response to the determined service class and a count of the at least one counter and contents of the at least one credit buffer; and controlling cell transmission timing using the at least one signal.

23. The computer readable medium of claim 22, wherein the step of transmitting comprises the step of transmitting a cell of the designated cell stream when the service class is determined to be constant bit rate (CBR).

24. The computer readable medium of claim 22, wherein the step of maintaining at least one counter comprises the steps of:

maintaining an individual counter for each cell stream, wherein the individual counter increments following each transmission of a cell of the corresponding cell stream; and maintaining a global counter, wherein the global counter increments following each transmission of a cell.

25. The computer readable medium of claim 22, wherein the step of transmitting comprises the steps of:

generating a credit buffer for each cell stream for which the service class is determined to be variable bit rate (VBR), wherein a size of the credit buffer is determined by a maximum burst cell size (MBC) of the corresponding cell stream and virtual circuit (VC); and grouping the credit buffers along with the corresponding cell streams in at least one group according to quality of service (QOS) parameters.

26. The computer readable medium of claim 25, wherein the step of transmitting further comprises the steps of:

determining whether the MBC has been exceeded for the designated cell stream;

incrementing the credit buffer of the designated cell stream in response to a determination that the MBC has not been exceeded, wherein cell credit is accumulated based on a sustained cell rate (SCR) of the designated cell stream;

determining a counter difference by subtracting the individual counter associated with the designated cell stream from the value of the global counter;

transmitting a cell of the designated cell stream when the counter difference is equal to or greater than an inverse of a peak cell rate (PCR) and the credit buffer of the designated cell stream contains credit, wherein transmission of the cell of the designated cell stream is based on the accumulated cell credit; and decrementing the credit buffer of the designated cell stream in response to cell transmission, wherein cell credit is consumed upon cell transmission.

27. The computer readable medium of claim 26, further comprising the step of bursting cell transmission to a peak cell rate (PCR) until credit is exhausted.

28. The computer readable medium of claim 22, wherein the network comprises Asynchronous Transfer Mode (ATM), Frame Relay, High-level Data Link Control (HDLC), Internet Protocol (IP), and Time Division Multiplexed (TDM) networks, wherein the network uses service connections comprising T1 connections.

29. The computer readable medium of claim 22, wherein the at least one signal is generated by at least one ATM layer upon cell transmission to serve as a clock signal to control a traffic shaping scheduler to control the sustained cell rate (SCR), peak cell rate (PCR), and MBC of an ATM network.

30. The computer readable medium of claim 22, further comprising the steps of:

determining the number of cell slots using an ATM line rate; and reserving at least one cell slot based on a sustained cell rate (SCR) of a virtual circuit (VC) cell stream relative to a bandwidth of the network.

31. The computer readable medium of claim 22, wherein the at least one cell stream comprises integrated traffic comprising data, voice, video, facsimile, and Local Area Network (LAN)-based traffic.

* * * * *